US012468898B2

(12) United States Patent
Imani et al.

(10) Patent No.: US 12,468,898 B2
(45) Date of Patent: Nov. 11, 2025

(54) MATHEMATICAL REASONING USING LARGE LANGUAGE MODELS

(71) Applicant: MICROSOFT TECHNOLOGY LICENSING, LLC, Redmond, WA (US)

(72) Inventors: Shima Imani, Sammamish, WA (US); Harsh Shrivastava, Redmond, WA (US); Liang Du, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 194 days.

(21) Appl. No.: 18/144,802

(22) Filed: May 8, 2023

(65) Prior Publication Data

US 2024/0296294 A1 Sep. 5, 2024

Related U.S. Application Data

(60) Provisional application No. 63/488,159, filed on Mar. 2, 2023.

(51) Int. Cl.
G06F 40/40 (2020.01)
G06F 16/332 (2019.01)
G06F 16/3329 (2025.01)

(52) U.S. Cl.
CPC .......... *G06F 40/40* (2020.01); *G06F 16/3325* (2019.01); *G06F 16/3329* (2019.01)

(58) Field of Classification Search
CPC .... G06F 40/40; G06F 16/3325; G06F 16/332; G06F 16/3329
See application file for complete search history.

(56) References Cited

U.S. PATENT DOCUMENTS 12,067,366 B1 * 8/2024 Heller ................ G06F 40/35
2011/0320187 A1 * 12/2011 Motik ................ G06F 16/3344
704/9

(Continued)

FOREIGN PATENT DOCUMENTS

CN 115705398 A 2/2023

OTHER PUBLICATIONS

Galatolo, et al., "Zero-shot Mathematical Problem Solving via Generative Pre-trained Transformers", Department of Information Engineering-ICEIS, vol. 1, 2022, pp. 479-483.

(Continued)

*Primary Examiner* — Huyen X Vo
(74) *Attorney, Agent, or Firm* — Newport IP, LLC; Jacob P. Rohwer

(57) ABSTRACT

Disclosed are techniques for an AI system with a large language mode (LLM) with improved accuracy and reliability in solving mathematical problems. An initial query is transformed into a template query by replacing the original input values with variables. Multiple prompts are sent to the LLM, each being different from one another, and contextually related to the template query. Multiple results are responsively received from the LLM, each result including an analytical expression to solve the mathematical problem. Each of the expressions is evaluated using a numerical evaluation tool with variables of the expression being assigned a common set of randomly sampled values. A consensus is achieved when the evaluated expressions satisfy a consensus condition, such as when all outputs match consistently over N experiments or trials. After the consensus condition is reached, the original inputs are evaluated with one or more of the expressions, and the solution is output.

15 Claims, 9 Drawing Sheets

(56) References Cited

U.S. PATENT DOCUMENTS

2023/0418815 A1* 12/2023 Zorn ............... G06F 40/18
2024/0185001 A1* 6/2024 Nagaraju .......... G06F 40/284

OTHER PUBLICATIONS

International Search Report and Written Opinion received for PCT Application No. PCT/US2024/017198, Jul. 1, 2024, 14 pages.

Weng, et al., "Large language models are reasoners with self-verification", arXiv preprint arXiv:2212.095612, Dec. 19, 2022, pp. 1-24.

Brown, et al., "Language models are few-shot learners", In Journal of Advances in neural information processing systems, 2020, pp. 1-25.

Chowdhery, et al., "PaLM: Scaling Language Modeling with Pathways", In Repository of arXiv:2204.02311v1, Apr. 6, 2022, 83 Pages.

Cobbe, et al., "Training verifiers to solve math word problems", In Repository of arXiv:2110.14168v1, Oct. 27, 2021, pp. 1-22.

Devlin, et al., "BERT: Pre-training of Deep Bidirectional Transformers for Language Understanding", In Repository of arXiv:1810.04805v1, Oct. 11, 2018, 14 Pages.

Gao, et al., "Making pre-trained language models better few-shot learners", In Repository of arXiv:2012.15723v1, Dec. 31, 2020, 15 Pages.

Geva, et al., "Did aristotle use a laptop? a question answering benchmark with implicit reasoning strategies", In Journal Transactions of the Association for Computational Linguistics, Apr. 26, 2021, pp. 346-361.

Kojima, et al., "Large language models are zero-shot reasoners", In Repository of arXiv:2205.11916v1, May 24, 2022, pp. 1-36.

Koncel-Kedziorski, et al., "Mawps: A math word problem repository", In Proceedings of the 2016 conference of the North American chapter of the association for computational linguistics: human language technologies, Jun. 2016, pp. 1152-1157.

Liu, et al., "Pretrain, prompt, and predict: A systematic survey of prompting methods in natural language processing", In Journal of ACM Computing Surveys, Jan. 16, 2023, pp. 1-35.

Liu, et al., "What makes good in-context examples for gpt-3?", In Repository of arXiv:2101.06804v1, Jan. 17, 2021, 12 Pages.

Patel, et al., "Are nlp models really able to solve simple math word problems?", In Repository of arXiv:2103.07191v1, Mar. 12, 2021, 15 Pages.

Rae, et al., "Scaling language models: Methods, analysis & insights from training gopher", In Repository of arXiv:2112.11446v1, Dec. 8, 2021, pp. 1-118.

Raffel, et al., "Exploring the limits of transfer learning with a unified text-to-text transformer", In Journal of Machine Learning Research, vol. 21, Issue 1, Jan. 1, 2020, pp. 1-67.

Reynolds, et al., "Prompt Programming for Large Language Models: Beyond the Few-Shot Paradigm", In proceedings of CHI EA '21: Extended Abstracts of the CHI Conference on Human Factors in Computing Systems, May 18, 2021, pp. 1-7.

Roy, et al., "Solving general arithmetic word problems", In Repository of arXiv:1608.01413v1, Aug. 4, 2016.

Schick, et al., "It's not just size that matters: Small language models are also few-shot learners", In Repository of arXiv:2009.07118v1, Sep. 15, 2020, 11 Pages.

Shin, et al., "Autoprompt: Eliciting knowledge from language models with automatically generated prompts", In Repository of arXiv:2010.15980v1, Oct. 29, 2020, 14 Pages.

Srivastava, et al., "Beyond the imitation game: Quantifying and extrapolating the capabilities of language models", In Repository of arXiv:2206.04615v1, Jun. 9, 2022, pp. 1-100.

Stanovich, et al., "Individual Differences in Reasoning: Implications for the Rationality Debate?", In Journal of Behavioral and Brain Sciences, vol. 23, Issue 5, Apr. 9, 2001, pp. 645-726.

Talmor, et al., "Commonsenseqa: A question answering challenge targeting commonsense knowledge", In Repository of arXiv:1811.00937v1, Nov. 2, 2018, 10 Pages.

Thoppilan, et al., "Lamda: Language models for dialog applications", In Repository of arXiv:2201.08239v1, Jan. 20, 2022, pp. 1-47.

Vaswani, et al., "Attention is all you need", In Book of Advances in Neural Information Processing Systems, Jun. 12, 2017, pp. 1-11.

Wang, et al., "Self-Consistency Improves Chain of Thought Reasoning in Language Models", In Repository of arXiv:2203.11171v3, Oct. 4, 2022, 24 Pages.

Wei, et al., "Chain of Thought Prompting Elicits Reasoning In Large Language Models", In Repository of arXiv:2201.11903v1, Jan. 28, 2022, 24 Pages.

International Preliminary Report on Patentability (Chapter I) received for PCT Application No. PCT/US2024/017198, mailed on Sep. 11, 2025, 8 pages.

* cited by examiner

TABLE 2

FIG. 9

MATHEMATICAL REASONING USING LARGE LANGUAGE MODELS

CROSS-REFERENCE TO RELATED APPLICATIONS

The present application is a non-provisional application of, and claims priority to, U.S. Provisional Application Ser. No. 63/488,159 filed on Mar. 2, 2023, the contents of which are hereby incorporated by reference in their entirety.

BACKGROUND

Artificial intelligence (AI) has a rich history, dating back to the mid-20th century when pioneers like John McCarthy and Marvin Minsky first began exploring the concepts. Initially, AI was seen as a way to replicate human intelligence in machines, and early efforts focused on developing systems that could perform tasks like playing chess or proving mathematical theorems.

Over the years, AI has evolved and expanded its focus to include a wide range of applications, from image recognition to natural language processing (NLP). Various AI systems and methods may now be applied in numerous domains.

Large language models (LLMs) are a recent development in the field of NLP. LLMs can apply deep learning algorithms, sometimes referred to as machine learning (ML), to leverage massive amounts of data, which can result in highly accurate language processing capabilities. Some example LLMs include GPT-3 and BERT, which are trained on vast amounts of text data, allowing them to model complex relationships in language and highly accurate predictions for a wide range of language tasks such as: translation, summarization, and responses to questions. This has led to breakthroughs in areas like chatbots, virtual assistants, and language-based recommendation systems.

Recently, AI has made interesting strides in the field of math problem solving. These efforts are now creating opportunities in solving complex math problems that were previously considered impossible or impractical. It is with respect to these and other considerations that the disclosure made herein is presented.

SUMMARY

Disclosed are techniques for an artificial intelligence (AI) system with a large language mode (LLM) with improved accuracy and reliability in solving mathematical problem. An initial query is transformed into a template query by replacing the original input values with variables. Multiple prompts are sent to the LLM, each being different from one another, and contextually related to the template query. Multiple results are responsively received from the LLM, each result including an analytical expression to solve the mathematical problem. Each of the expressions is evaluated using a calculator or any numerical evaluation tool with variables of the expression being assigned a common set of random values. A consensus is achieved when the evaluated expressions satisfy a consensus condition, such as when all of the outputs match consistently over N experiments or trials. After the consensus condition is reached, the original inputs are evaluated with one or more of the expressions, and the solution is output.

In some embodiments, a method for an artificial intelligence (AI) system with a large language mode (LLM) to solve a mathematical problem is described, the method comprising: receiving an initial query Q that presents a problem with original input values; transforming the initial query Q into a template query QT, wherein the original input values are replaced with variables; sending multiple prompts to the LLM, wherein each of the multiple prompts is different from one another, and contextually related to the template query QT; responsive to the multiple prompts, receiving multiple results from the LLM, wherein the multiple results each include an analytical expression to solve the mathematical problem; evaluating the outputs of the multiple analytical expressions with the variables being assigned to a common set of randomly sampled values; determining if a statistically significant consensus is achieved for the evaluated outputs; and outputting final results when the statistically significant consensus condition is reached.

In various embodiments, a computer-readable storage medium having computer-executable instructions stored thereupon is described that, when executed by a processing system, cause the processing system to: receive an initial query Q that presents a problem with original input values; transform the initial query Q into a template query QT, wherein the original input values are replaced with variables; send multiple prompts to the LLM, wherein each of the multiple prompts is different from one another, and contextually related to the template query QT; responsive to the multiple prompts, receive multiple results from the LLM, wherein the multiple results each include an analytical expression to solve the mathematical problem; evaluate the outputs of the multiple analytical expressions with the variables being assigned to a common set of randomly sampled values; determine if a statistically significant consensus is achieved for the evaluated outputs; and output final results when the statistically significant consensus condition is reached.

In some embodiments, a processing system is described, comprising: a processor; and a computer-readable storage medium having computer-executable instructions stored thereupon that, when executed by the processor, cause the processing system to: receive an initial query Q that presents a problem with original input values; transform the initial query Q into a template query QT, wherein the original input values are replaced with variables; send multiple prompts to the LLM, wherein each of the multiple prompts is different from one another, and contextually related to the template query QT; responsive to the multiple prompts, receive multiple results from the LLM, wherein the multiple results each include an analytical expression to solve the mathematical problem; evaluate the outputs of the multiple analytical expressions with the variables being assigned to a common set of randomly sampled values; determine if a statistically significant consensus is achieved for the evaluated outputs; and output final results when the statistically significant consensus condition is reached.

Various technical differences and benefits are achieved by the described systems and methods. For example, the presently described systems and methods are able to provide improved accuracy and reliability in solving problems by leveraging LLM's access to numerous skills and resources to analytically process queries, and also to validate the results with calculator methods to a statistical significance. The overall efficiency of generating, executing, testing, and validating multiple prompts can thus provide for improved accuracy, which may also omit wasted time exploring inaccurate solutions, and thus improve processing time by eliminating unnecessary review cycles.

In AI systems, such as LLM and ML based systems, the applicability domain refers to the range of inputs or situations in which a model is expected to perform well. The applicability domain can be influenced by factors such as the quality and quantity of data available, the complexity of the problem, the algorithms and models used by the AI system, and the level of human intervention and oversight. The applicability domain may also identify scenarios where the model's predictions are reliable and accurate, as well as scenarios where the model may struggle to deliver accurate results. Understanding the applicability domain is critical for AI practitioners and users, as it can help to identify potential risks and limitations of the model, and ensure that it is only used in scenarios where it is most effective. The presently described reasoning model has applicability over multiple domains, including but not limited to, manufacturing, logistics and supply chain management, energy management, and financial investments, to name a few.

In one example, an applicability domain may include ML systems where skills and resources of the LLM may be leveraged to identify trends in manufacturing to predict and reduce possible manufacturing problems. For example, a goal may be to predict and prevent manufacturing defects by applying statistical models that monitor changes in relevant factors such as materials, temperature, humidity, and other environmental factors. The applicability domain for this problem could be defined as statistical modelling mathematics and the range of conditions under which the machine learning model is expected to perform accurately, and outside of which its predictions may be unreliable or incorrect. These conditions may include changes in production volatility, unexpected events such as accidents, part failures or shifts in materials. Understanding and defining the applicability domain for this problem is important to ensure that the models can be used effectively for methods of manufacturing, factory planning, process controls, and supply ordering decisions.

Another applicable domain for math prompting and AI may be in the field of education, specifically in assisting students in solving mathematical problems. The AI system with a large language model (LLM) could be used to generate multiple prompts or hints to guide students in solving math problems, providing step-by-step explanations or alternative approaches. The LLM may also evaluate the student's responses and provide feedback to help them improve their problem-solving skills. The applicability domain in this case could encompass various levels of math education, ranging from elementary to advanced mathematics, and could be tailored to specific topics such as algebra, geometry, calculus, and more. Additionally, the AI system could be used as a tool for self-directed learning, tutoring, or as a supplement to traditional classroom instruction, enhancing the accuracy and reliability of math problem-solving assistance for students.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 9 is a table illustrating various example math problems evaluated using the presently disclosed techniques.

DETAILED DESCRIPTION

Figure 1:
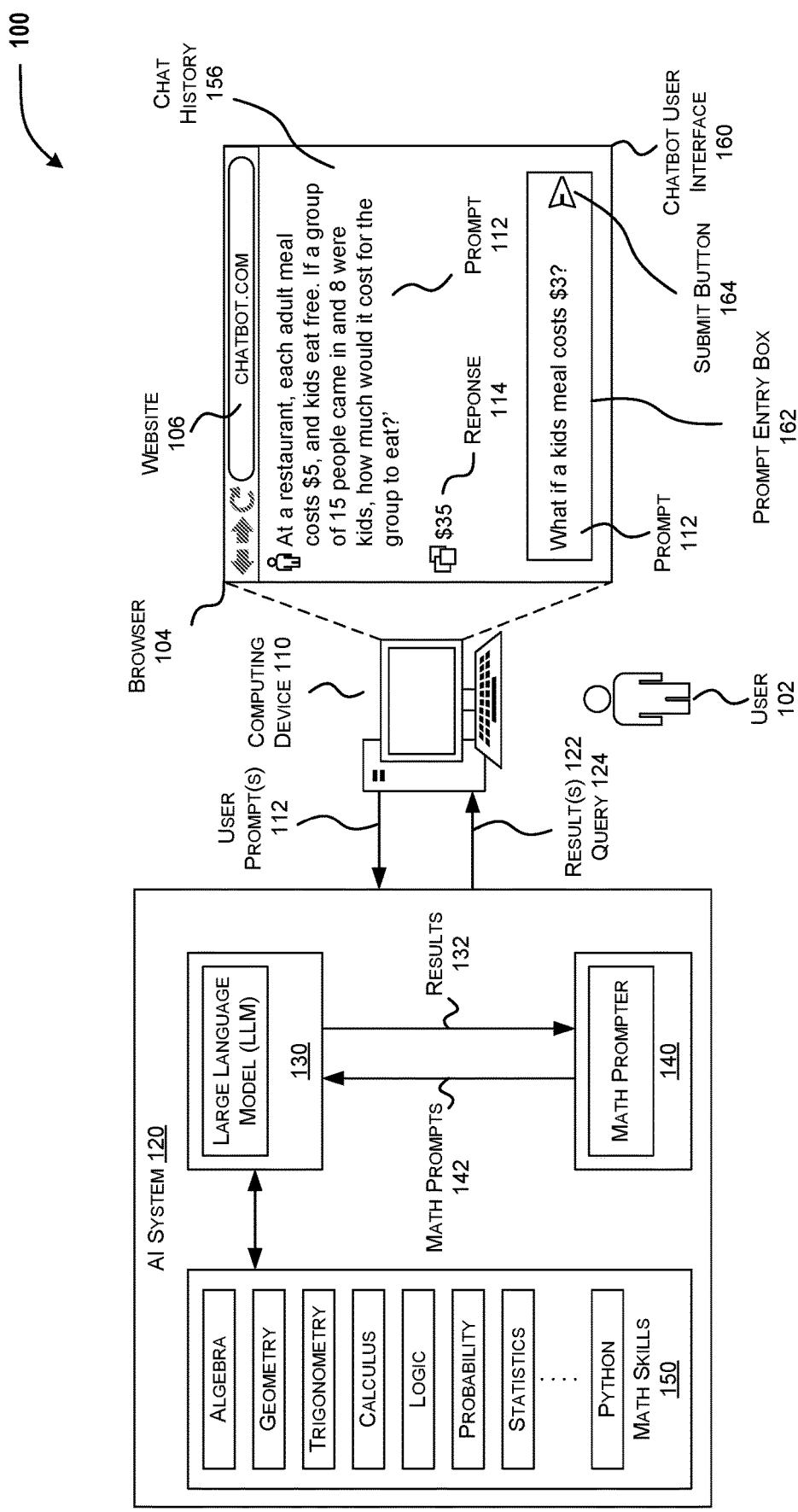
FIG. 1 illustrates an example system that is capable of implementing aspects of the techniques and technologies presented herein.

Large Language Models (LLMs) have limited performance when solving arithmetic reasoning tasks and often provide incorrect answers. Unlike natural language understanding, math problems typically have a single correct answer, making the task of generating accurate solutions more challenging for LLMs. Moreover, LLMs tend to exude the same level of confidence in presenting a wrong answer as they do a correct answer. This type of false confidence leads to an inherent distrust in LLMs tools.

The present disclosure presents an improved approach to solving math problems in AI systems that use LLMs. The presented techniques improve performance of LLMs on math problems, while also providing increased reliance in the predictions. Briefly stated, a math prompting technique is described that generates multiple mathematical expressions to solve the same math problem in different ways, where the results of those expressions are comparatively evaluated to validate the answers and thereby raise the confidence level in the output results. Additional technical differences and benefits will be realized in light of the present disclosure.

Recent advancements in natural language processing (NLP) can be attributed to massive scaling of Large Language Models (LLMs). A very interesting recent discovery is that LLMs are naturally good (in-context) Zero-shot or few-shot learners. A Zero-shot learner refers to the ability of a system or model to perform a task without any explicit training or prior examples. In other words, the system can generalize to new tasks that it has never seen before, based on its understanding of the underlying concepts or patterns. In contrast a few shot learner is an AI model or system that can learn a new task from only a few examples or instances, as opposed to traditional machine learning techniques that require large amounts of labeled data to perform well. Few-shot learning is particularly useful in situations where acquiring large amounts of labeled data is impractical.

Prompts are a useful tool in machine learning. Prompting refers to the input or information provided to a model or system to help it perform a task. This input can take many forms, such as text, images, or other data. The goal of prompting is to guide the model towards the correct output or behavior. For example, in natural language processing, a model may be prompted with a question or a statement, and it must generate a relevant response. The prompt provides the context and information necessary for the model to understand the task and generate an appropriate response.

In terms of prompting, Zero-shot learning and few-shot learning differ in the amount of information they require to perform a task. When models are conditions on a few examples, we can refer to this as few-shot prompting. In contrast, providing instructions to solve a task is can be referred to as Zero-shot prompting. Extensive research efforts are being poured into designing these prompts, either manually or automatically. Although these efforts have been quite successful for single-step system-I tasks (i.e., tasks that require fast, intuitive, unconscious reactive thinking), these prompting techniques are inadequate in their performance on system-II tasks (i.e., where multi-step, deliberate, conscious reflective thinking is required.

Problems may be broken down into smaller pieces in an attempt to solve the problem step-by-step. This intuitive approach has been extended to the development of 'chain-of-thought' (CoT) prompting techniques for LLMs. The use of CoT has resulted in improved performance on a range of NLP tasks. The present disclosure describes techniques to apply Zero-shot-CoT methods for solving mathematical reasoning tasks.

Recent work in Zero-shot-CoT techniques demonstrated a remarkable accuracy improvement on the 'MultiArith' data (i.e., from 17.7% to 78.7%). The presently disclosure identifies two key aspects that are lacking in the previous CoT based prompting. First, although the chain-of-thought followed by the model improved the results, there is no check on the validity of the steps followed by the chain-of-thought prompting. Second. the confidence in the predictions of LLMs are not provided. In order to address these gaps, the present disclosed techniques derive inspiration from human behaviors employed to solve a math question by breaking the problem down to simpler multi-step procedures. Additionally, the techniques described herein make use of multiple ways to validate the approach taken at each step in problem solving, such as detailed analysis with repeated trials, randomized values to test the bounds of solutions, and statistical consensus models to find agreement among multiple approaches and solutions.

General Process Topology

The general topology of the presently disclosed techniques can be described by the following procedure. Initially, a question is posed to the AI system that requires a mathematically reasoned solution (e.g., a math problem). This question can be referred to as the original question or initial query 'Q'. Before a solution to the original question is attempted, the AI system transforms original question Q into a template question, which can be referred to as 'QT'. For the template question QT, the numerical entries or input values from the original question Q are replaced with variables. Next, a series math prompts are generated, each being of a different type, which are then submitted to the LLM. The LLM can then attempt to solve template question QT, analytically, and in different ways based on each of the different prompts. For example, suppose we introduce two types of math prompts as follows: (Prompt-1) 'Derive an Algebraic expression', and (Prompt-2) 'Write a Python function'. The LLM will process the math prompts using the context of the template question QT and produce two different analytical expressions to solve the same math problem (algebraic for one, and Python code for the other). The two resulting expressions solve the problem QT in terms of variables. Since the expressions are solved in this "template form" with variables, the analytical solutions can now be evaluated using a set of randomly assigned values to the QT variables. The end results may then be compared to determine if the two solutions agree. Statistics can be gathered based on the success or failure of the comparison, and then the process can be repeated again over a number of trials until a statistically significant number of agreements are achieved. For example, once the solutions of the analytical functions are in 'consensus' over N experiments, then the original input values from Q can be applied to obtain the final solution. In the case where there is no definite consensus, then the number of experiments or trials can be increased. For each additional experiment, the process may repeat the steps of sending math prompts to the LLM, receiving the expressions generated by the LLM, applying random values to the variables to calculate results for each expression, and comparing the calculated results to determine if a consensus is achieved.

The above described process can be implemented in an AI based system implementation, such as will be described with respect to FIGS. 1 and 2. Additional details of examples process implementations are illustrated with respect to FIGS. 3-6, as will be discussed further below.

Example System

FIG. 1 illustrates an example system 100 that is capable of implementing aspects of the techniques and technologies presented herein. As illustrated, the system 100 may include an artificial intelligence (AI) system 120, that is interfaced to a user 102 via a computing device 110. The AI system 120 may include a large language model 130, a math prompter component 140, and a number of math based skills 150 that are available to the LLM 130.

User 102 may operate computing device 110 to navigate a browser 104 to a chatbot website 106. Chatbot website 106 is one non-limiting example of an application program that may utilize a natural language model (NLM) interface to interact with users in a human-like way. The AI system 120 used by the chatbot website 106 may be located on a remote computing device, although it may alternatively be implemented by computing device 110. In other examples, the chatbot website may be implemented one a local or secured network that is inaccessible to the public (e.g., behind a firewall with secured access), such as might be used for a proprietary tool on a secured platform. In still other examples, the chatbot website implementation may be replaced with an application program that is run directly on computing device 110, which may also be in a secured environment.

A chatbot user interface 160 used by the chatbot website 106, in this example, may include a prompt entry box 162 for a user to enter a prompt 112. Clicking or otherwise selecting a trigger associated with a submit button 164 on the chatbot user interface 160 will result in prompt 112 being submitted to the AI system 120 that is used by the chatbot website 106. Chatbot user interface 160 may also include a history 166 of prior submitted prompts 112 and any prior result 122 or query 124 received from the AI system 120 responsive to a prior submitted prompt 112. In some instances, after a prompt 112 is submitted to the chatbot user interface 160, an icon or graphic element may be shown (e.g., blinking ellipses, an hourglass, spinning wheel, etc.) in the history area of the display to indicate that the submitted prompt is under review such as when a math problem is being processed by the AI system 120.

After a user prompt 112 is submitted to the AI system 120 via the chatbot user interface 160, the AI based engine 120 processes the prompt to capture the semantic meaning of the words or phrases in the prompt so that the information is in a form to be processed by the LLM. This process may be achieved by leveraging the embedding representations obtained by running a natural language understanding model that annotates different components of the user prompt. The embedding vectors can then be used as input features for various NLP tasks by the LLM, such as sentiment analysis or text classification, or other meaningful insights from the text data.

The AI system 120 may use various natural language processing (NLP) techniques to determine context around keywords and phrases in the text data. One technique, called contextual word embeddings, represents each word found in a text prompt as a dense, low-dimensional vector that captures meaning in the context of the surrounding words by applying deep learning models. The LLM 130 in the present AI system 120 can be trained on large amounts of text data to learn the patterns and relationships between words and phrases in different contexts. When processing a piece of text data, words and phrases can be context related to their closely related target keyword or phrase in their embeddings by the LLM 130.

For the present AI system 120, the prompt 112 may either be sent directly to the math prompter component 140 or processed by the LLM 130 which may invoke operation of the math prompter component 140. For instances where the math prompter component 160 receives the prompt 112 from the computing device 110, the math prompter component 160 may leverage the LLM 130 to determine a context for the prompt 112, as well as identify a math problem to be solved.

The LLM 130 may leverage additional math skills 150 or other functions, skills or resources as may be necessary to generate results 132 for the math prompter component 140, or results 122 for the user 102. The LLM 130 may be aware of these skills and resources 140 by a registration process, where functions, skills, and resources are registered with the LLM 130. The math skills leveraged by the LLM 130 may be numerous, including but not limited to skills in algebra, geometry, trigonometry, calculus, logic, probability, statistics, and code development skills such as Python, java, C/C++ and other languages.

The math prompter component 140 may be generally described as a software component that receives a user prompt or input query (e.g., 112) for a math problem, and applies the various processes described herein to solve the math problem with the LLM 130. For example, the math prompter component 140 may be configured to send math prompts 142 to the LLM 130. The LLM 139, may responsively leverage various math skills to generate response or results 132 to the math prompts 142, which are returned to the math prompter component 140. After the completed math solution for the problem is reached math prompter 140, the result or result(s) 122 may either be provided to the computing device 110 directly, or provided to the LLM 130 to apply NLM processes to prepare the final results before being sent to the user 102 via the computing device 110 and the chatbot user interface 160.

Although the above description illustrates a text based user interface, this is merely one non-limiting example, and the specific implementation of the user interface may be text based, graphically based, voice based, or any combination thereof, without departing from the spirit of the present disclosure.

Figure 2:
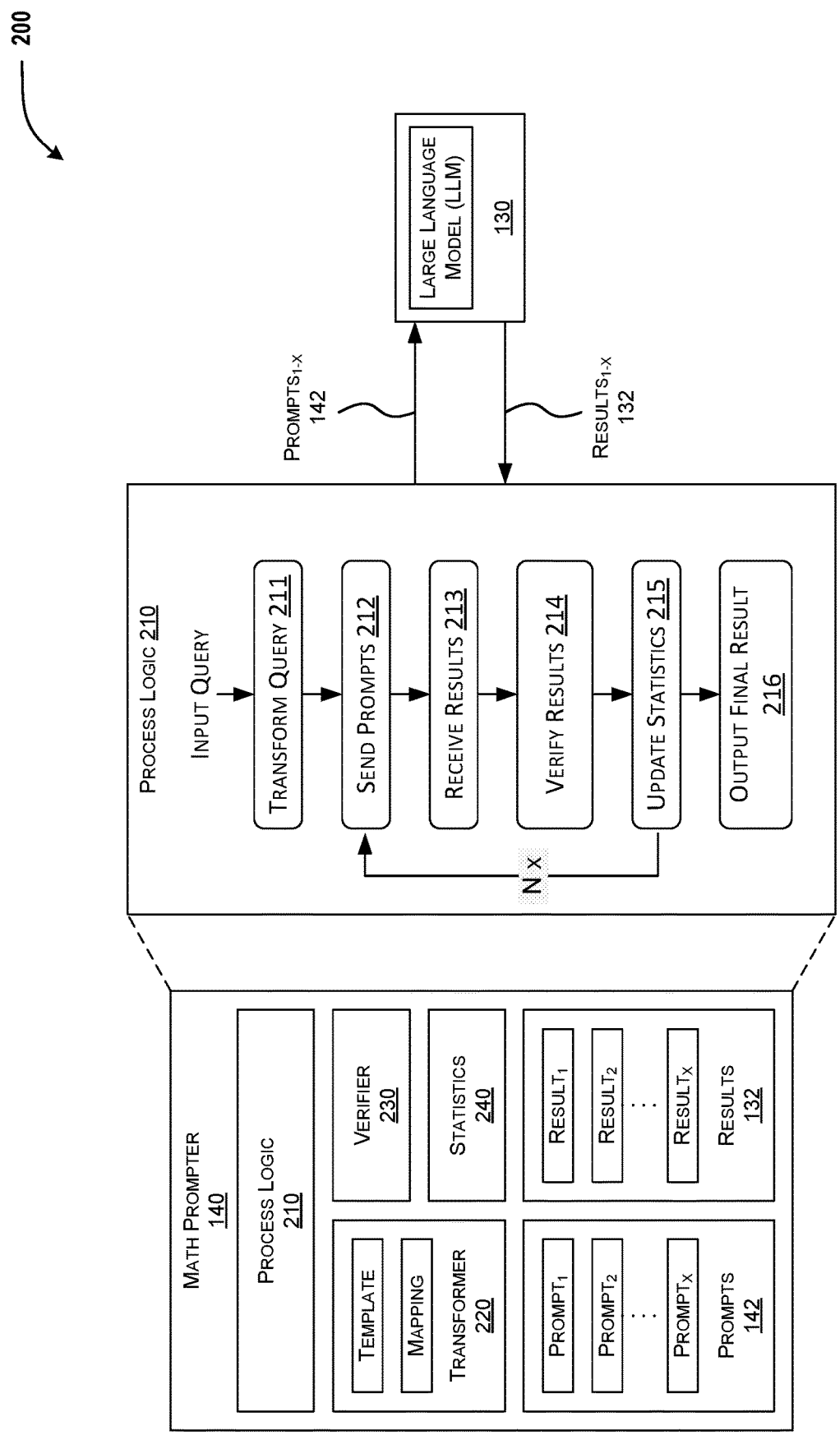
FIG. 2 illustrates a detailed example system that is capable of implementing aspects of the techniques and technologies presented herein.

FIG. 2 illustrates another example system 200 that is capable of implementing aspects of the techniques and technologies presented herein. Similar to system 100, system 200 includes a large language mode 130 and a math prompter 140. Although not shown in FIG. 2, system 200 may be implemented as part of an artificial intelligence (AI) system 120, that is interfaced to a user 102 via a computing device 110. System 200 is substantially similar to system 100, and thus similarly labeled components will operate as previously described above.

The math prompter component 140 in FIG. 2 may correspond to a software component in the AI system 120, which may further include functional components for a process logic 210, a transformer 220, a verifier 130, and statistics 240. Additionally, memory or data storage may be leveraged by the math prompter component 140, as may be required for execution by any of the various functional components 220-240. In one example, memory or data storage may be used by math prompter component 140 to store a number (X) of prompts 142, such as indicated by $Prompt_1$ through $Prompt_X$ in FIG. 2. In another example, math prompter component 140 may use memory or data storage to store a corresponding number (X) of results 132, such as indicated by $Result_1$ through $Result_X$. Other data elements required by math prompter component 140 are not shown, but are contemplated and considered within the scope of the examples described herein.

Additional functional components of process logic 210 are illustrated in FIG. 2 as a process flow including blocks 211-216. Although these blocks are presented as partitions of logic, the specific implementation is not so limited, and the various blocks may be combined or divided as may be desired in a particular implementation. Initially, at block 211 (Transform Query), an input query Q is transformed to create a template query QT with inputs mapped to variables as previously described. Block 211 may be implemented as a transformer component 220, as shown. Next, at block 212 (Send Prompts), a number (X) of prompts 142 are selected and sent to the LLM 130 ($Prompts_{1-X}$). The prompts 142 may each correspond to a different type of proposed math solution (e.g., algebra, probability, Python code, etc.). Next, at block 213 (Receive Results), results 132 are received from the LLM 130 ($Results_{1-X}$), which are responsive to the prompts 142 initially sent at block 212. Each of the results may include analytical expressions that are different solutions to same initial transformed math problem QT. Next, at block 214 (Verify Results), a set of randomly assigned values are assigned to the QT variables and each of the expressions received from the LLM 130, which are in template form, are evaluated to determine if they agree with one another. Block 214 may be implemented as a verifier component 230, as shown. Next, at block 215 (Update Statistics), statistics are gathered based on the success or failure of the previous experiment. Statistics can be gathered based on the success or failure of matched outputs identified at block 214. In some examples, the process of blocks 212-215 can be repeated again until a number (N) of consecutive agreements are found at block 214. After the requisite number (N) of consecutive agreements is determined as reached or achieved, the process may continue from block 215 to block 216. Block 215 may be implemented as a statistics component 240, as shown. At block 216 (Output Final Result), the original input values from Q can be applied to the variables of QT using one of the expressions, and a final solution to the problem may be calculated and then provided to the user as previously described.

The choice of the expression to use for the final solution may be decided using any reasonable method. In one example, the first expression from the most iteration (e.g., $Result_1$) may be selected. In another example, a randomly picked expression from the most recent iteration (e.g., any of $Result_1$-$Result_X$) may be selected. In still example, the expressions from the most recent iteration may be ranked by a criteria (most commonly used, most statistically accurate, etc.) to determine the selection. Other examples are also contemplated, and considered within the scope of this disclosure.

For some math problems, a consensus may not be achieved the requisite number of times (N), either due to complexity in the math (e.g., lack of convergence due to local minima or maxima in the solution space, etc.) or due to a lack of sufficient skills for the specific type of math problem. There are a few ways to address this type of failed convergence. In one example the user may simply be prompted by the AI to rephrase or revise the question posed. In another example the AI system may adjust the threshold for convergence by reducing or relaxing the required number of times for success (N). In still another example, the AI system may simply increase the amount of time used in finding a solution, and continues the process as described. Other examples are also possible, such as restarting the process with a different set of prompts, requesting the LLM to search and discover additional skills, etc.

Observations and Methodology

Since LLMs are generative models, it is tricky to ensure that answers that are generated are accurate, especially for mathematical reasoning tasks. However, the process followed by students to solve arithmetic problems may be used as a rough guide in solution formation. Some example methods employed by students in solving mathematical reasoning tasks includes the following: comparative compliance with known results, multi-verification, cross-checking, and compute verification.

Compliance with known results: By comparing the proposed solution to a known result, accuracy of the proposed solution may be assessed and adjustments may be made as necessary to achieve compliance. This is type of adjustment is particularly useful when a mathematical problem is a standard type of problem with a well-established solution, where a similar solution should be expected to reach a similar type of answer.

Multi-verification: By approaching a problem from multiple perspectives (e.g., varied mathematical approaches) and comparing the results, the validity of the proposed solution may be accessed. Verification across multiple perspectives ensures that the proposed solution is both sound and accurate.

Cross-checking: The process of solving a problem is just as necessary as the final answer. Verifying the correctness of the intermediate steps of the solving process can provide a clear understanding of the solution. Moreover, intermediate step checking can catch routine errors and problems that tend to creep in for long or complex math problems.

Compute verification: Utilizing a calculator or computer to perform arithmetic calculations can assist in verifying the accuracy of a final answer.

The presently proposed methods of the math prompter component 150 applies some of these concepts and observations to the LLM answer generation process. FIGS. 1 and 2, as previously described present an overview of the operating environment and high-level steps followed by the math prompter component 150 to solve a mathematical reasoning problems. In some experimental implements of the math prompter component 150, a state-of-the-art GPT-3 DaVinci completion engine was used as the LLM 130. Various experiments, which will be discussed in more detail further below, were performed that indicated a significant improvement of accuracy by employing the techniques described herein. For example, accuracy of the MultiArth data achieved an improvement of accuracy from 78.7% to 92.5%.

The following question 'Q' from the MultiArith dataset was applied to demonstrate the problem solving process followed by the math prompter component 150.

Q: At a restaurant, each adult meal costs $5 and kids eat free. If a group of 15 people came in and 8 were kids, how much would it cost for the group to eat?

The question Q postulated, being of an algebraic problem type, is first transformed into an algebraic template form by replacing the numeric entries with variables using a key-value mapping. In this particular instance, the modified question 'QT' becomes:

QT: at a restaurant, each adult meal costs A and kids eat free. if a group of B people came in and C were kids, how much would it cost for the group to eat?

Mapping: {A:5, B:15, C:8}

Math prompts are selected for submission to the LLM. Based on the original question being recognized as an algebraic type of problem, the solution space should include methods that are useful for algebraic problem solving. The intuition provided by the multi-verification and crosschecking thought processes discussed above is applied to the LLM 130 by applying the described math prompting methodology. Analytical solutions of QT are found by the LLM for each math prompt. For example, two different mathematical approaches may be applied to the instant algebraic problem, a direct algebraic method and a Pythonic method. Thus, the following two math prompts can be sent to the LLM 130, via prompts 142, to generate additional context for QT:

Algebraic prompt: "Write a mathematical equation and generate the answer forma starting with 'Answer='"

Pythonic prompt: "Write a Python function that returns the answer."

In response to the above prompts, the LLM 130 generates the following output expressions, which are communicated to the math prompter component 150 via results 132:

(Expression 1, Algebraic type of output)

$$Answer = A * (B - C)$$

(Expression 2, Python type of output)

$$def\ total\_price(A, B, C):$$
$$return\ A * (B - C)$$

The above generated analytical solutions gives the user a hint into the 'intermediate thought process' of the LLM 130. Incorporating additional prompts improves the accuracy and consistency of the results. This will, in turn, enhance the AI systems ability to generate more precise and effective solutions to problems.

The expressions generated in the previous step are next evaluated to perform a type of cross-checking. Multiple randomized key-value mappings are applied to the input variables for QT. In some examples, a Python's eval( ) method may be used to evaluate the individual expressions, but other alternative techniques may also be employed for expressions evaluation. The outputs of the evaluations are next compared to see if there is a consensus among the answers. Also, cross-checking to verify consistent answers among multiple solutions increases the confidence level that the answers are correct and reliable. Once the expressions provide matched outputs, the original values of the variables for input Q can be applied to compute the final answer as:

Algebraic-answer=35
Pythonic-answer=35

As previously described, statistical significance can also be imparted by iteratively executing the process of submitting prompts, receiving results, and compute verification. Thus, to statistically validate the proposed solution, the steps are iterated until a threshold number (N) of repeated successes are achieved. For various examples described herein, a threshold of N=5 has been used, but this parameter may be varied based on the problem type as well as other reasons previously stated. In short, the most frequent value observed can be provided as the answer to the problem.

Datasets

The above described process was evaluated on a Multi-Arith dataset, which is a subset of the Math World Problem Repository. This example dataset is a collection of mathematical problems that are specifically designed to test the ability of machine learning models to perform complex arithmetic operations and reasoning. These problems demand the application of multiple arithmetic operations and logical reasoning to be successfully solved.

Baselines

One of the popular baselines is the standard Zero-shot model. In the Zero-shot model, the LLM models are trained in a way that it is able to recognize and classify new objects or classes that it has never seen before during training. This is achieved by utilizing the semantic relationships between classes.

Our proposed solution is also compared against the state-of-the-art Zero-shot-CoT prompting model. The Zero-shot-CoT prompting model is a very recent approach that addresses the limitations of the standard Zero-shot learning by incorporating a 'context of the task' using CoT to improve the performance. Briefly, the Zero-shot-CoT method follows the following procedure: (1) Given a question Q, a prompt is submitted to the LLM such as "Lets think step-by-step" followed by question Q; which generates a response Z. (2) After response Z is received, a second prompt is provided such as "The answer (Arabicnumericals) is" followed by Z, which achieves a final result.

Experiment Results

Table 1, shown below, compares the performance of the presently disclosed systems and methods that use a math prompter process (designated as MathPrompter in Table 1) against the baseline models. The results of few-shot & Zero-shot learning based approaches are shown. Also, other models are shown for comparative purposes, with a different number of parameters identified, further highlighting the significance of the novel approaches presented herein. Since, our math prompter process is a Zero-shot-CoT (175B parameters) type of method, the state-of-the-art Zero-shot-CoT (175B parameters) model and a Zero-shot (175B parameters) were selected for fair comparison. We report an accuracy of 92.5% which is a huge improvement to the other state-of—the art models with 78.7% and 17.7% accuracy, respectively.

TABLE 1

Accuracy Comparison of MultiArith dataset.

| Model | Accuracy |
| --- | --- |
| Zero-shot | 17.7 |
| Zero-shot (PaLM 540B) | 25.5 |
| Zero-shot-CoT | 78.7 |
| Zero-shot-CoT (PaLM 540B) | 66.1 |
| Zero-shot-CoT + self consistency (PaLM 540B) | 89.0 |
| Zero-shot-CoT (MathPrompter) | 92.5 |
| Few-Shot (2 samples) | 33.7 |
| Few-Shot (8 samples) | 33.8 |
| Few-Shot-CoT (2 samples) | 84.8 |
| Few-Shot-CoT (4 samples) | 90.5 |
| Few-Shot-CoT (8 samples) | 93.0 |
| Zero-Plus-Few-Shot-CoT (8 samples) | 92.8 |

Figure 9:
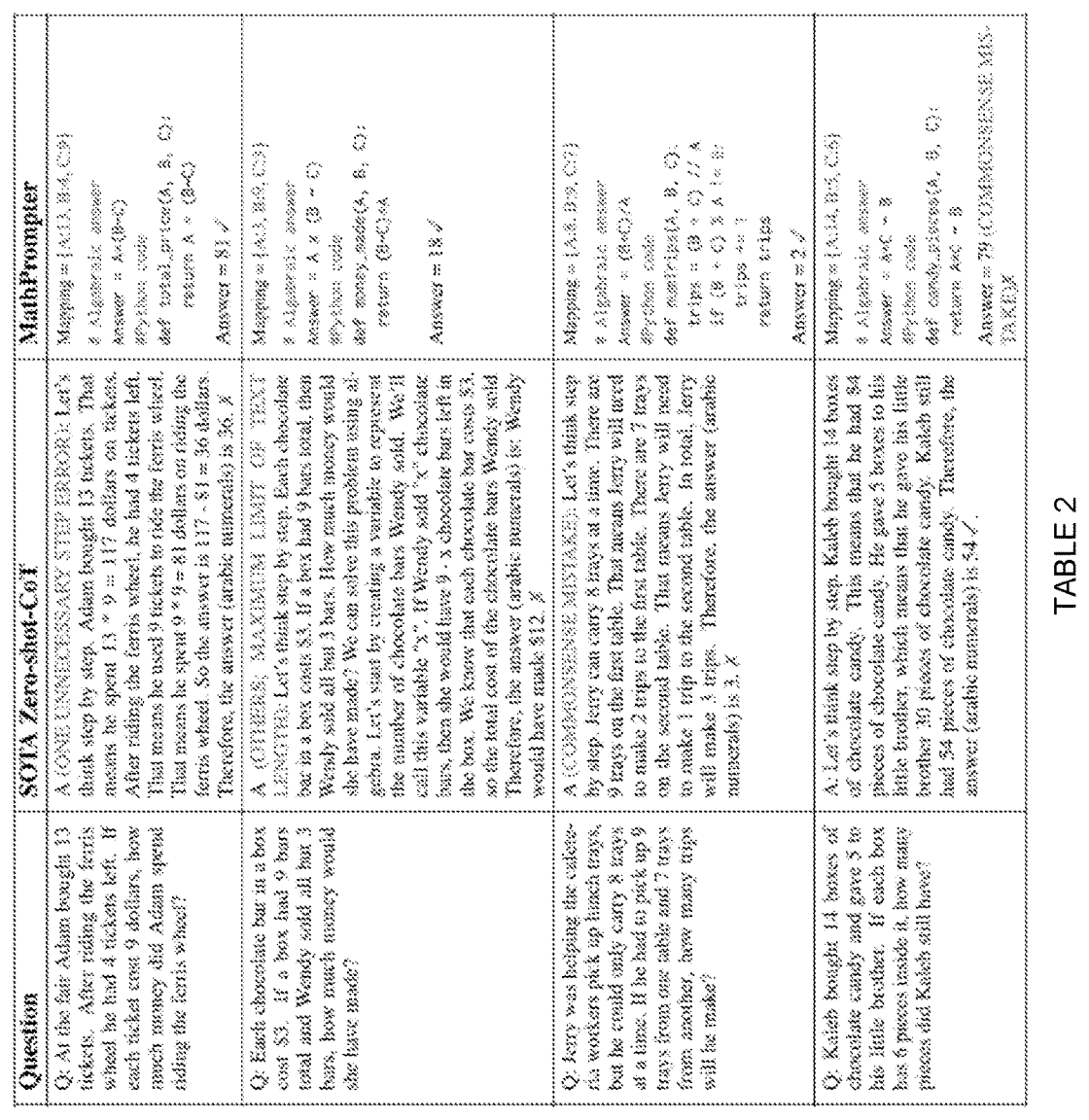

Table 2, which is provided in FIG. 9, presents a sample set of questions and their respective outputs, intermediate steps, and final answers generated by both the presently disclosed "MathPrompter" methods, and a state-of-the-art Zero-shot-CoT model. For simplicity, only one output of MathPrompter for each question is shown for both the Algebraic and Pythonic outputs.

The table highlights areas where the Zero-shot-CoT model falls short, and where these shortcomings can be remedied by the presently disclosed MathPrompter methods, which was specifically designed to address these issues. For example, the generated answers sometimes have one step of error, which can be remedied by running the model multiple times and reporting the consensus results. Additionally, the reasoning steps in Zero-shot-CoT model can be excessively lengthy, but Pythonic and Algebraic methods can address this by typically requiring fewer tokens. Furthermore, in some examples even though the reasoning steps are correct, the final computation is incorrect. The presently disclosed MathPrompter methods address cam address this problem by using a calculator type of operation, such as the Python's eval( ) method function.

In many cases, the MathPrompter process generates correct intermediate and final answers. However, there are a few cases, such as the last question in Table 2, where both the Algebraic and Pythonic outputs agree with one-another, but are nevertheless erroneous. Additional methods and modification to the process are contemplated to alleviate this problem, such as described previously.

Example Detailed Process Flows

The above described technique, features, and methods may be implemented in multiple ways, including the flow charted illustrations of FIGS. 3-6 described below, which are considered non-limiting examples.

Figure 3:
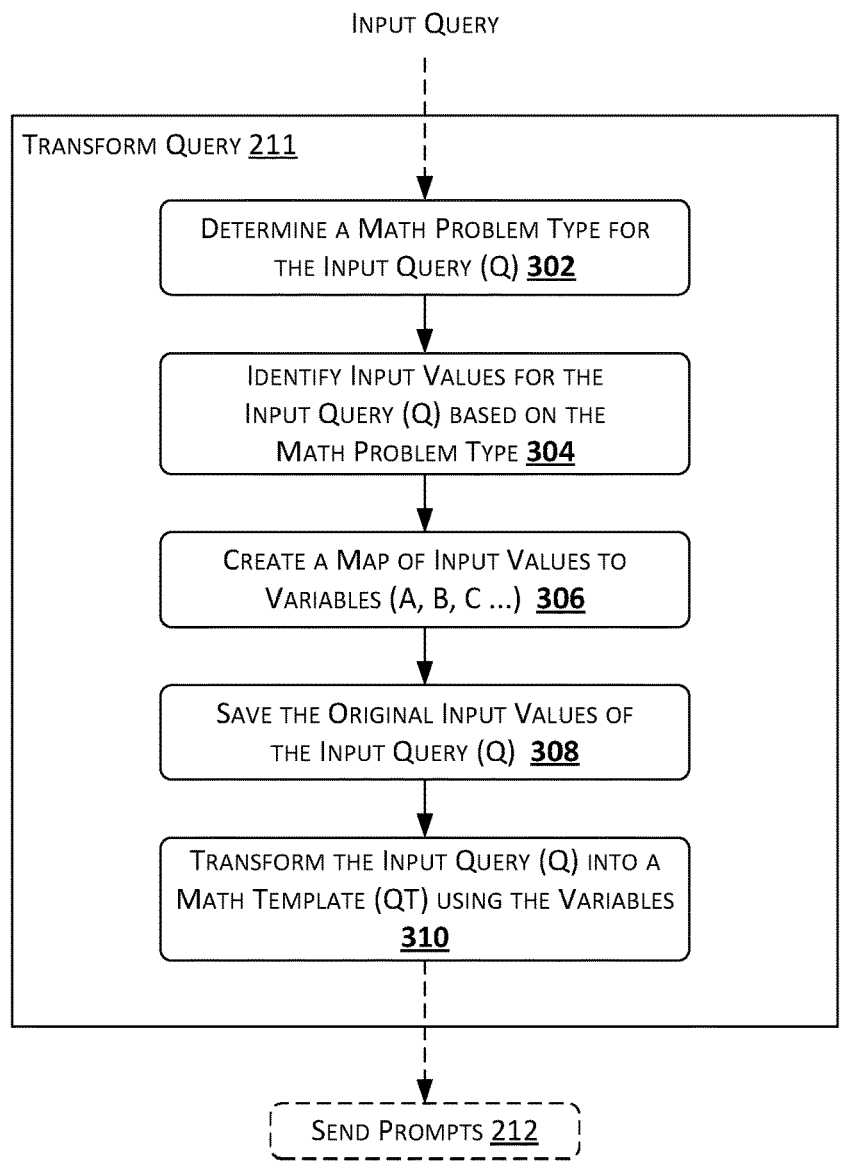
FIG. 3 illustrates is an example flow diagram for aspects of a mathematical reasoning system, in accordance with various aspects described herein.

FIG. 3 illustrates is an example flow diagram 300 for aspects of a mathematical reasoning system, in accordance with various aspects described herein. The flow diagram 300 includes blocks 302, 304, 306, 308, and 310; which together provide a working example of a transform query block 211 such as discussed previously with respect to FIG. 2. Additionally, the input query and send prompts block 212 are shown to illustrate the relationship between FIG. 2 and FIG.

3. As previously described, an input query Q may be provided to the transform query block 211. Processing for the various blocks of flow diagram 300, which may be described as processes, methods, steps, or functions, may commence at block 302.

At block 302, "Determine a Math Problem Type for the Input Query (Q)", a prompt from a user (e.g., 112) that presents a math problem may be received by the math prompter component (e.g., 140) for processing as an input query. The math problem may be categorized at this step to determine what type of math problem is presented. For example, the problem may contextual be identified as an algebraic problem, a geometric problem, a logic problem, or a statistics problem, to name a few. Processing continues from block 302 to block 304.

At block 304, "Identify Input Values for the Input Query (Q) based on the Math Problem Type", the math prompter evaluates the input query (Q) and identifies the text strings that correspond to input values for the stated problem. These input values may be identified by any sort of data element, such as a numbers or words/phrases including any variety of symbols (e.g., '\$', '%', '° C.', '¢', '£', '€', etc.). The specifically identified input values may also depend on a context such as the type of math problem identified at block 302. Processing continues from block 304 to block 306.

At block 306, "Create a Map of Input Values to Variables (A, B, C . . . )", a map is created to track the pairing of input values identified at block 304 to variables. The variables may use any reasonable nomenclature such as simple letters, symbols, or strings (e.g., A, B, A1, B2, input1, input2, etc.). Each input that is identified at bock 304 is paired to a different variable at block 306. Processing may continue from block 306 to block 308.

At block 308, "Save the Original Input Values of the Input Query (Q)", each of the original input values from the input query Q, which are now mapped to variables at block 206, are stored for later use. Processing may continue from block 308 to block 310.

At block 310, "Transform the Input Query (Q) into a Math Template (QT) using the Variables", a new query QT is constructed from the original input query Q, where each of the identified input values at block is replaced by a corresponding one of the variables. Thus, at block 310, the input query Q is transformed to into a template question QT with inputs mapped to variables as previously described. Processing may continue from block 310 to block 212, which is previously described with respect to FIG. 2.

In some examples, the process of transforming an input query Q to a template question or math template QT need not include all of the steps outlined above or be performed in the same manner or order as FIG. 3. Thus, it is contemplated that the illustrated blocks may be combined or divided in some examples, while other examples may add or remove various blocks. In a simple example, the process of creating a math template or template question from an input query may simply be accomplished by the AI leveraging the LLM 130 itself.

Figure 4:
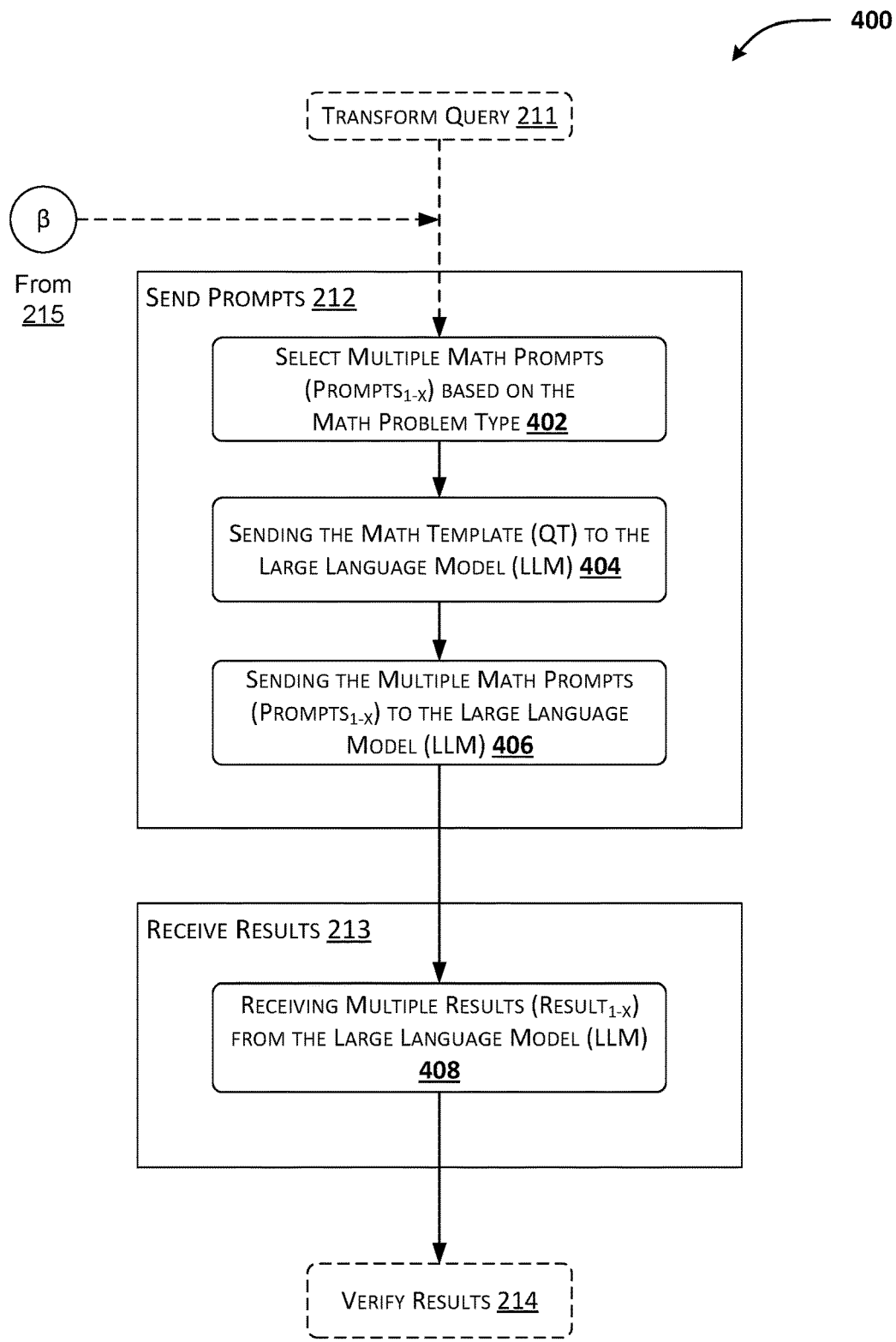
FIG. 4 illustrates is an example flow diagram for additional aspects of a mathematical reasoning system, in accordance with various aspects described herein.

FIG. 4 illustrates is an example flow diagram 400 for additional aspects of a mathematical reasoning system, in accordance with various aspects described herein. The flow diagram 400 includes blocks 402, 404, 406, and 408; which together provide a working example of the sends prompts block 212 and the receives results block 213, such as discussed previously with respect to FIG. 2. Additionally, the transform query block 211 and compute verification block 213 are shown to illustrate the relationship between FIG. 2 and FIG. 4. As previously described, a template question QT may be provided to the Sends prompts block 212. Processing for the various blocks of flow diagram 400, which may be described as processes, methods, steps, or functions, may commence at block 402.

At block 402, "Select Multiple Math Prompts (Prompts$_{1-x}$) based on the Math Problem Type", a number (X) of prompts 142 are selected to be sent to the LLM 130 (Prompts$_{1-x}$) by the math prompter component (e.g., 140). The specific prompts that are selected, and the number (X) of prompts as well, may vary depending on the type of math problem or other factors such as the number of available skills or methods to the LLM 130. The prompts 142 themselves ideally each correspond to a different type of proposed math solution (e.g., an algebra type of prompt, a probability type of prompt, a Python code type of prompt, etc.). Processing continues from block 402 to block 404.

At block 404, "Sending the Math Template (QT) to the Large Language Model (LLM)", the previously created template question (QT) or math template block 211 is sent to the LLM 130. As will become apparent, analytical solutions of QT can then found by the LLM 130 once the math queries are received by the LLM 130 Processing continues from block 404 to block 406.

At block 406, "Sending the Multiple Math Prompts (Prompts$_{1-x}$) to the Large Language Model (LLM)", the previously selected prompts (Prompts$_{1-x}$) at block 402 are sent to the LLM 130. After the prompts are received, the LLM model can begin to analyze the template question to find multiple analytical solutions based on the prompts. For example, an algebraic prompt may result in an algebraic style analytical solution, while a Python prompt may result in a Python style analytical solution. Processing continues from block 406 to block 408.

In some examples, the operations or functions of blocks 404 and 406 may combined into a single block. An example combined block may read, "Sending the Multiple Math Prompts (Prompts$_{1-x}$) and the Math Template (QT) to the Large Language Model (LLM)." This is merely one non-limiting example, and others are contemplated.

At block 408, "Receiving Multiple Results (Result$_{1-x}$) from the Large Language Model (LLM)", the multiple analytical solutions that are generated by the LLM 130, based on the (Prompts$_{1-x}$), are received by the math prompter component 150 as results 132. For example, an algebraic prompt may result in receipt of an algebraic style analytical solution in one result (Result$_1$), while a Python prompt may result in receipt of a Python style analytical solution in another result (Result$_2$). Each of these results 134 may thus include analytical expressions that are different solutions to same initial transformed math problem QT. Processing continues from block 408 to block 214.

In some examples, the process of sending prompts and receiving results may not include all of the steps outlined above or be performed in the same manner or order as FIG. 4. Thus, it is contemplated that the illustrated blocks may be combined or divided in some examples, while other examples may add or remove various blocks.

Figure 5:
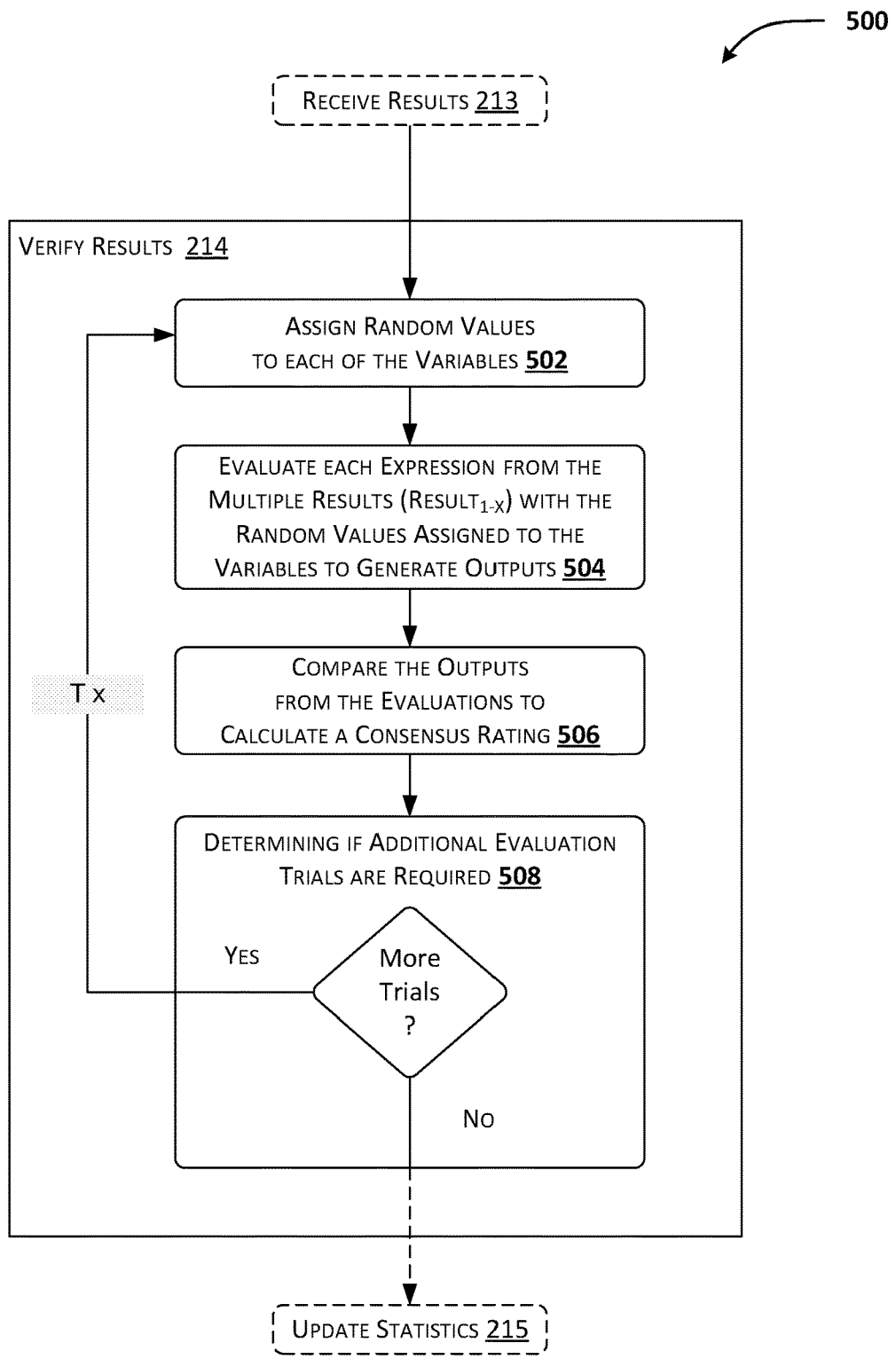
FIG. 5 is an example flow diagram for yet other aspects of a mathematical reasoning system, in accordance with various aspects described herein.

FIG. 5 illustrates is an example flow diagram 500 for yet other aspects of a mathematical reasoning system, in accordance with various aspects described herein. The flow diagram 500 includes blocks 502, 504, 506, and 508; which together provide a working example of the verify results block 214, such as discussed previously with respect to FIG. 2. Additionally, the receive results block 213 and the update statistics block 215 are shown to illustrate the relationship between FIG. 2 and FIG. 5. As previously described, results 134 received by the receive results block 213 may be provided to the verify results block 214. Processing for the various blocks of flow diagram 500, which may be described as processes, methods, steps, or functions, may commence at block 502.

At block 502, "Assign Random Values to each of the Variables", each of the variables previously identified for the template questions QT are assigned a random value by the math prompter component 140. These values will be applied to expressions in subsequent steps. Processing continues from block 502 to block 504.

At block 504, "Evaluate each Expression from the Multiple Results (Result$_{1-x}$) with the Random Values Assigned to the Variables to Generate Outputs", the previously received analytical solutions of QT, as found in Results$_{1-x}$, are evaluated using the set of values assigned to the variables at 502. In some examples the evaluation is performed by a Python eval ( ) function, but other examples that can perform evaluate functions numerically are also contemplated. The output each evaluated expression is a data value, which corresponds to the math problem solution for that expression. Processing continues from block 504 to block 506.

At block 506, "Compare the Outputs from the Evaluations to Calculate a Consensus Rating", the previously determined outputs of the evaluated expressions of the Results$_{1-x}$, at block 504, are compared to one another at block 506. Ideally, a consensus is reached between all the outputs and a solution to the math problem is achieved. However, in other examples, the outputs of the different expressions may fail to agree and additional trials may be required to achieve confidence in the solution. Thus, the comparison in outputs for a consensus is an important first step in determining if a solution has been realized. Processing continues from block 506 to block 508.

At block 508, "Determining if Additional Evaluation Trials are Required", the previous comparison of the outputs at block 506 are used to determine if additional trials of random values may be required. For example, in some instances a set of expressions may disagree with one another under one set of random values, while the same set of expressions may agree with one another under another set of random values. A loop may be introduced in the verify results block 214 between blocks 502 and 508 as one possible way to address this strange condition. Processing at block 508 continues to block 502 when additional trials are required, and alternatively from block 508 to block 215 when no additional trials are required. The total number of trials for iteration between blocks 502 and 508 may be designated as T.

The test condition for additional trials at block 508 may be varied based upon specific test conditions and goals. In a simple example, the total number of trials is set to one (T=1), and the loop is never invoked. In another example, the total number of trials is set to ten (T=10), and the test condition to exit the loop may be that if more than 60% (e.g., 6 or more) of the trials have a unanimous consensus, then the verify results block 214 is considered a success or pass. Other example test conditions may also be implemented in this manner, and thus the inner loop provides some flexibility in inconsistent test conditions that may result from the random data values.

In some examples, the verify results block 214 may not include all of the steps outlined above or be performed in the same manner or order as FIG. 5. Thus, it is contemplated that the illustrated blocks may be combined or divided in some examples, while other examples may add or remove various blocks.

Figure 6:
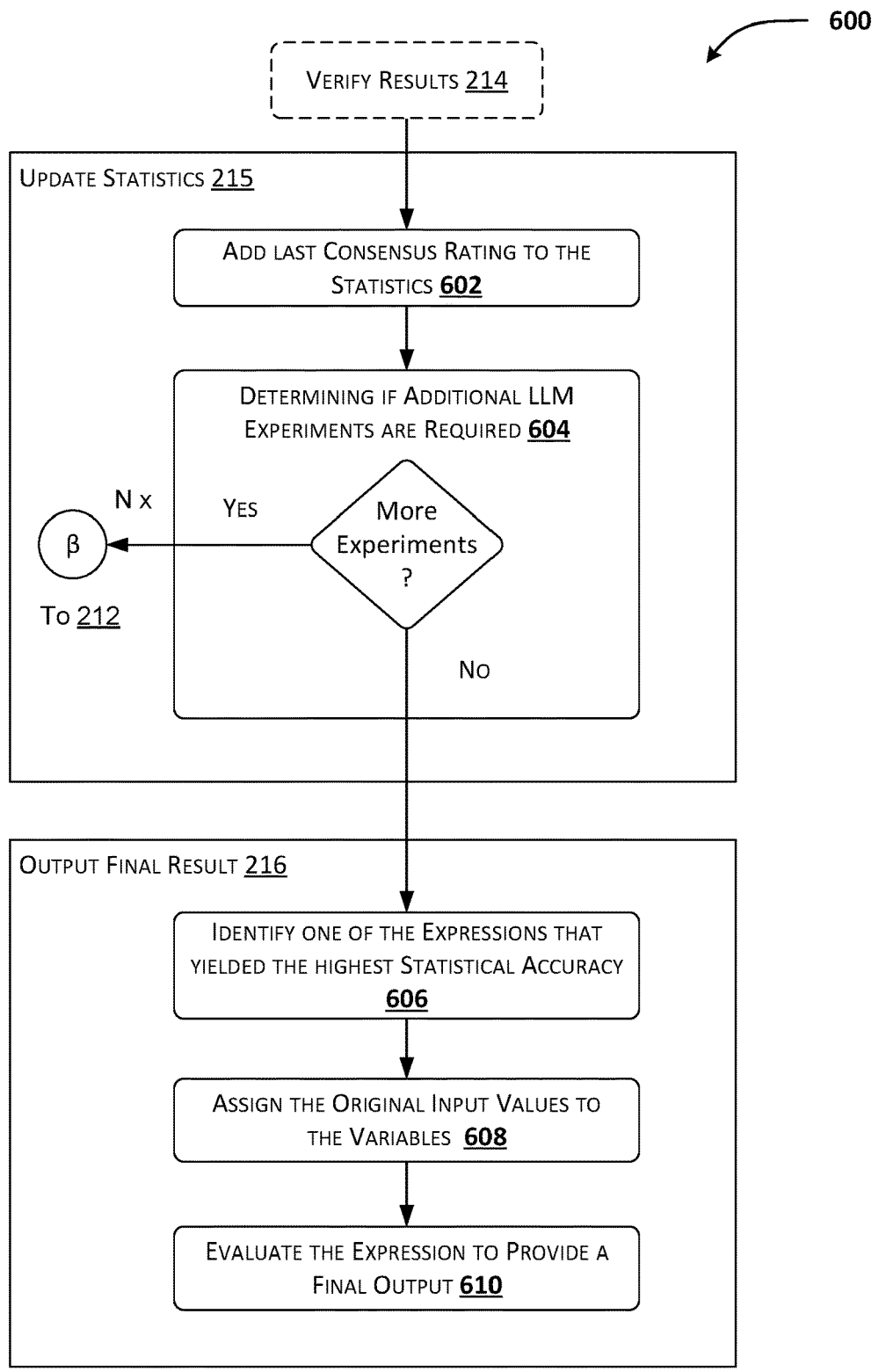
FIG. 6 is an example flow diagram for still other aspects of a mathematical reasoning system, in accordance with various aspects described herein.

FIG. 6 is an example flow diagram 600 for still other aspects of a mathematical reasoning system, in accordance with various aspects described herein. The flow diagram 600 includes blocks 602, 604, 606, 608 and 610; which together provide a working example of the update statistics block 215 and the output final result block 216, such as discussed previously with respect to FIG. 2. Additionally, the verify results block 214 is shown to illustrate the relationship between FIG. 2 and FIG. 6. As previously described, consensus results from block 214 may be provided as inputs to the update statistics block 215. Processing for the various blocks of flow diagram 600, which may be described as processes, methods, steps, or functions, may commence at block 602.

At block 602, "Add Last Consensus Rating to the Statistics", the last consensus rating of the verify results block 214 is combined or added to the statistics from any prior iterations of the experiment loop, which is between blocks 212 and 215 as shown in FIG. 2, and also as shown by the Greek letter connector β in FIG. 4 and FIG. 6. Processing continues from block 602 to block 604.

At block 604, "Determining if Additional LLM Experiments are Required", the statistics from block 602 are used to determine if additional experiments may be required to prompt the LLM 130. Processing at block 604 continues to block 212 when additional experiments are required, and alternatively from block 604 to block 606, which is the start of block 216, when no additional experiments are required. The total number of experiments for iteration between blocks 212 and 215 may be designated as N, as previously described.

Statistics can be gathered based on the success or failure of matched outputs identified at block 214. In some examples, the process of blocks 212-215 can be repeated again until a number (N) of consecutive agreements are found at block 214. After the requisite number (N) of consecutive agreements is reached, the process may continue from block 215 to block 216. Block 215 may be implemented as a statistics component 240, as shown. At block 216 (Output Final Result), the original input values from Q can be applied to the variables of QT using one of the expressions, and a final solution to the problem may be calculated and then provided to the user as previously described.

The test condition for additional experiments at block 604 may be varied based upon specific test conditions and goals. In a simple example, the total number of experiments is set to one (N=1), and the loop is never invoked. In another example, the total number of experiments is set to ten (N=10), and the test condition to exit the loop may be that if more than 80% (e.g., 8 or more) of the experiments have a unanimous consensus. In yet another example, the total number of experiments is set to five (N=5), and the test condition to exit the loop may be that a complete consensus must be achieved N times in a row to exit the loop. Other example test conditions may also be implemented in this manner, and thus the outer loop provides some flexibility in design.

At block 606, "Identify one of the Expressions that yielded the highest Statistical Accuracy", the one of the expressions that yielded a highest rate of success (e.g., highest consensus rating) is selected as a representative solution to the math problem. Processing continues from block 606 to block 608.

The choice of the expression to use for the final solution in block 606 can vary by implementation, and may be decided using an alternative method than that described above. For example, a simple choice may be to simply select first expression that was part of the consensus from the most recent iteration (e.g., $Result_1$). In another example, a randomly picked expression be selected from all expressions in the consensus from the most recent iteration (e.g., any of $Result_1$-$Result_x$) may be selected. In still other examples, the expressions from the most recent iteration may be ranked by a criteria (most commonly used, most statistically accurate, etc.) to determine the selection. Other examples are also contemplated, and considered within the scope of this disclosure.

At block 608, "Assign the Original Input Values to the Variables", where the original input values from Q, which were saved at block 308, retrieved applied to the variables of QT using the selected expression from block 606. Processing continues from block 608 to block 610.

A block 610, "Evaluate the Expression to Provide a Final Output", a final solution to the problem may be calculated by evaluating the expression identified at block 606, and then the final solution may be provided to the user as previously described.

In some instances, the user may wish to see all of the solutions that were found by the math prompter component 150. In these instances, blocks 606 through 610 may simply loop through all the available expression and provide an output of the complete set of solutions found. Additionally, the user may desire to see the confidence rating of the solution by also receiving the consensus statistics as part of the provided output. Each of these aspects are contemplated herein, and considered within the scope of the disclosure.

Additional Observations

The MathPrompter concepts are disclosed herein with numerous implementation examples. The presented techniques are a novel approach that improves LLM performance on mathematical reasoning problems, and also addresses an important concern of building the user trust to some extent in the LLM predictions. An intuitive process, based approximately on how students solve arithmetic problems are applied to a LLM model in a non-obvious way that utilizes the Zero-shot chain-of-thought prompting technique. MathPrompter incorporates numerous innovations to AI such as cross-checking intermediate steps and solving the same problem using multiple approaches in its design. Also, it has been empirically shown that the disclosed model is comparable to state-of-the-art Fewshot-CoT models as well as the larger Zero-shot-CoT models that have 540B parameters.

The MathPropter concepts are extensible not only to solving complex math problems, but also to other types of complex problem solving that may or may not relate to math.

The particular implementation of the technologies disclosed herein is a matter of choice dependent on the performance and other requirements of a computing device. Accordingly, the logical operations described herein are referred to variously as states, operations, structural devices, acts, modules, or components. These states, operations, structural devices, acts, modules, or components can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

Figure 7:
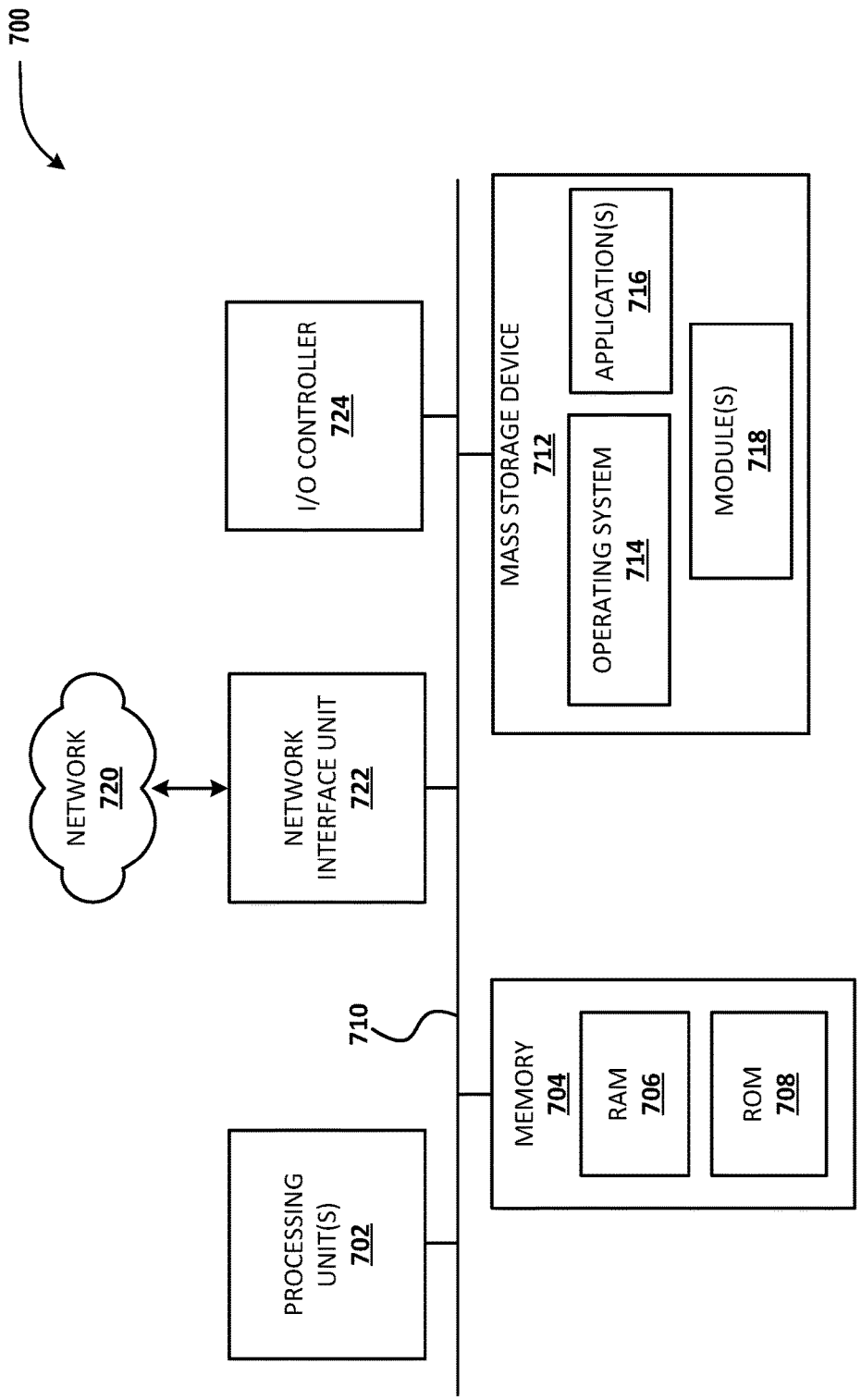
FIG. 7 is a computer architecture diagram illustrating an illustrative computer hardware and software architecture for a computing system capable of implementing aspects of the techniques and technologies presented herein.

FIG. 7 shows additional details of an example computer architecture 700 for a device, such as a computer or a server configured as part of the systems described herein (e.g., 100, 200, etc.), capable of executing computer instructions (e.g., a module or a program component described herein). The computer architecture 700 illustrated in FIG. 7 includes processing unit(s) 702, a system memory 704, including a random-access memory 706 ("RAM") and a read-only memory ("ROM") 708, and a system bus 710 that couples the memory 704 to the processing unit(s) 702.

Processing unit(s) or processor(s), such as processing unit(s) 702, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 700, such as during startup, is stored in the ROM 708. The computer architecture 700 further includes a mass storage device 712 for storing an operating system 714, application(s) 716, modules 718, and other data described herein.

The mass storage device 712 is connected to processing unit(s) 702 through a mass storage controller connected to the bus 710. The mass storage device 712 and its associated computer-readable media provide non-volatile storage for the computer architecture 700. Although the description of computer-readable media contained herein refers to a mass storage device, it should be appreciated by those skilled in the art that computer-readable media can be any available computer-readable storage media or communication media that can be accessed by the computer architecture 700.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 700 may operate in a networked environment using logical connections to remote computers through the network 720. The computer architecture 700 may connect to the network 720 through a network interface unit 722 connected to the bus 710. The computer architecture 700 also may include an input/output controller 724 for receiving and processing input from a number of other devices, including a keyboard, mouse, touch, or electronic stylus or pen. Similarly, the input/output controller 724 may provide output to a display screen, a printer, or other type of output device.

It should be appreciated that the software components described herein may, when loaded into the processing unit(s) 702 and executed, transform the processing unit(s) 702 and the overall computer architecture 700 from a general-purpose computing system into a special-purpose computing system customized to facilitate the functionality presented herein. The processing unit(s) 702 may be constructed from any number of transistors or other discrete circuit elements, which may individually or collectively assume any number of states. More specifically, the processing unit(s) 702 may operate as a finite-state machine, in response to executable instructions contained within the software modules disclosed herein. These computer-executable instructions may transform the processing unit(s) 702 by specifying how the processing unit(s) 702 transition between states, thereby transforming the transistors or other discrete hardware elements constituting the processing unit(s) 702.

Figure 8:
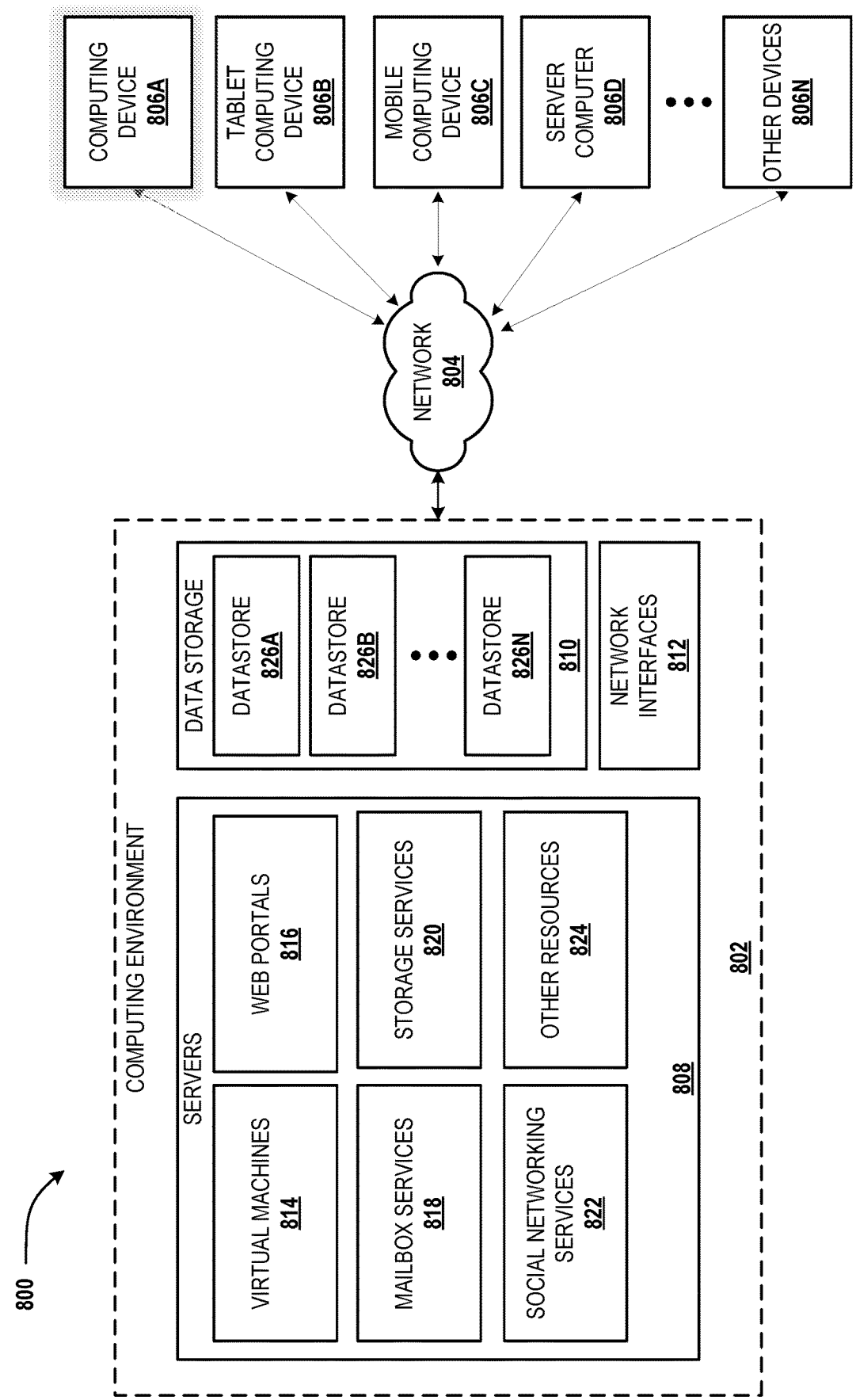
FIG. 8 is a diagram illustrating a distributed computing environment capable of implementing aspects of the techniques and technologies presented herein.

FIG. 8 depicts an illustrative distributed computing environment 800 capable of executing the software components described herein. Thus, the distributed computing environment 800 illustrated in FIG. 8 can be utilized to execute any aspects of the software components presented herein. For example, the distributed computing environment 800 can be utilized to execute aspects of the software components described herein.

Accordingly, the distributed computing environment 800 can include a computing environment 802 operating on, in communication with, or as part of the network 804. The network 804 can include various access networks. One or more client devices 806A-806N (hereinafter referred to collectively and/or generically as "clients 806" and also referred to herein as computing devices 806) can communicate with the computing environment 802 via the network 804. In one illustrated configuration, the clients 806 include a computing device 806A such as a laptop computer, a desktop computer, or other computing device; a slate or tablet computing device ("tablet computing device") 806B; a mobile computing device 806C such as a mobile telephone, a smart phone, or other mobile computing device; a server computer 806D; and/or other devices 806N. It should be understood that any number of clients 806 can communicate with the computing environment 802.

In various examples, the computing environment 802 includes servers 808, data storage 810, and one or more network interfaces 812. The servers 808 can host various services, virtual machines, portals, and/or other resources. In the illustrated configuration, the servers 808 host virtual machines 814, Web portals 816, mailbox services 818, storage services 820, and/or, social networking services 822. As shown in FIG. 8 the servers 808 also can host other services, applications, portals, and/or other resources ("other resources") 824.

As mentioned above, the computing environment 802 can include the data storage 810. According to various implementations, the functionality of the data storage 810 is provided by one or more databases operating on, or in communication with, the network 804. The functionality of the data storage 810 also can be provided by one or more servers configured to host data for the computing environment 802. The data storage 810 can include, host, or provide one or more real or virtual datastores 826A-826N (hereinafter referred to collectively and/or generically as "datastores 826"). The datastores 826 are configured to host data used or created by the servers 808 and/or other data. That is, the datastores 826 also can host or store web page documents, word documents, presentation documents, data structures, algorithms for execution by a recommendation engine, and/or other data utilized by any application program. Aspects of the datastores 826 may be associated with a service for storing files.

The computing environment 802 can communicate with, or be accessed by, the network interfaces 812. The network interfaces 812 can include various types of network hardware and software for supporting communications between two or more computing devices including, but not limited to, the computing devices and the servers. It should be appreciated that the network interfaces 812 also may be utilized to connect to other types of networks and/or computer systems.

It should be understood that the distributed computing environment 800 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 800 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 800 to utilize the functionality described herein for providing the techniques disclosed herein, among other aspects.

The present disclosure is supplemented by the following example clauses:

Example 1: A method for an artificial intelligence (AI) system (120) with a large language mode (LLM, 130) to solve a mathematical problem, the method comprising: receiving an initial query Q that presents a problem with original input values; transforming the initial query Q (211) into a template query QT, wherein the original input values are replaced with variables; sending multiple prompts (212) to the LLM (130), wherein each of the multiple prompts is different from one another, and contextually related to the template query QT; responsive to the multiple prompts, receiving multiple results (213) from the LLM (130), wherein the multiple results each include an analytical expression to solve the mathematical problem; verifying results (214) by evaluating the outputs of the multiple analytical expressions with the variables being assigned to a common set of randomly sampled values; updating statistics (215) to determine if a statistically significant consensus is achieved for the evaluated outputs; and outputting final results (216) when the statistically significant consensus condition is reached.

Example 2: The method of Example 1, further comprising: looping through a process until the statistically significant consensus condition is reached for the evaluated outputs, wherein the process comprises the steps of: sending multiple prompts to the LLM; receiving multiple results from the LLM; evaluating the outputs of the multiple analytical expressions; and determining if the consensus condition is achieved for the evaluated outputs.

Example 3: The method of Example 1, wherein updating statistics to determine if the statistically significant consensus condition is reached for the evaluated outputs comprises one of: determining if all of the evaluated outputs are matched; determining if all of the evaluated outputs are matched over a consecutive number of trial experiments; determining if a percentage of all of the evaluated outputs are matched above a specified percentage; and determining if a percentage of all of the evaluated outputs are matched above a specified percentage over a consecutive number of trial experiments.

Example 4. The method of Example 1, further comprising: looping through a process over a number of LLM experiments (N), the process comprising the steps of: sending multiple prompts to the LLM; receiving multiple results from the LLM; evaluating the outputs of the multiple analytical expressions; comparing the outputs of the evaluations to calculate a consensus rating; determining if additional LLM experiments are required based on a test condition; and terminating the loop when the test condition indicates that additional LLM experiments are not required.

Example 5. The method of Example 4, wherein the test condition comprises one of: terminating the loop when the number of LLM trials (N) is reached; terminating the loop when all of the evaluated outputs are matched; terminating the loop when all of the evaluated outputs are matched over a specified percentage; terminating the loop when all of the evaluated outputs are matched over a specified number of consecutive evaluation trials; and terminating the loop when all of the evaluated outputs are matched over the specified percentage for the specified number of consecutive trials.

Example 6. The method of Example 3, further comprising relaxing the test condition for terminating the loop when a non-convergence condition is detected.

Example 7. The method of Example 1, wherein transforming the initial query Q further comprises: identifying the original input values in the initial query Q; creating a mapping between the identified original input values and variables; and replacing each of the identified values with the variables to provide the template query QT.

Example 8. The method of Example 1, wherein verifying the results by evaluating the outputs of the multiple analytical expressions further comprises: looping through a process over a number of trials (T), the process comprising the steps of: assigning random values to the variables; evaluating each of the analytical expressions with the variables having the assigned random values; comparing the outputs of the evaluations to calculate a consensus rating; determining if additional trials are required based on a test condition; and terminating the loop when the test condition indicates that additional trials are not required.

Example 9. The method of Example 8, wherein the test condition comprises one of: terminating the loop when the number of trials (T) is reached; terminating the loop when all of the evaluated outputs are matched; terminating the loop when all of the evaluated outputs are matched over a specified percentage; terminating the loop when all of the evaluated outputs are matched over a specified number of consecutive trials; and terminating the loop when all of the evaluated outputs are matched over the specified percentage for the specified number of consecutive trials.

Example 10. A method of Example 1, wherein outputting final results further comprises: assigning the original input values to the variables; selecting one or more of the expressions for evaluation; evaluating the outputs of each selected expression with the variables being assigned to the original input values; and providing the output of each of the selected expressions.

Example 11. The method of Example 10, further comprising: providing the selected expressions with the variables being assigned to the original input values, and providing the confidence ratings of the selected expressions.

Example 12. The method of Example 10, wherein selecting one or more of the expressions for evaluation comprises one of: selecting a single expression; selecting all expressions; selecting a single expression above a specified confidence rating; selecting all expressions above a specified confidence rating; selecting a first expression from all expressions in the consensus from the most recent iteration; randomly picking a single expression from all expressions in the consensus from the most recent iteration; ranking all the expressions in the consensus from the most recent iteration, and selecting a highest ranked expression; and ranking all the expressions in the consensus from the most recent iteration, and selecting all ranked expressions above a specified rating.

Example 13. The method of Example 10, wherein selecting one or more of the expressions for evaluation comprises one of: selecting a single expression; selecting all expressions; selecting a single expression above a specified confidence rating; selecting all expressions above a specified confidence rating; selecting a first expression from all expressions in the consensus from the most recent iteration; randomly picking a single expression from all expressions in the consensus from the most recent iteration; ranking all the expressions in the consensus from the most recent iteration, and selecting a highest ranked expression; and ranking all the expressions in the consensus from the most recent iteration, and selecting all ranked expressions above a specified rating.

Example 14. A computer-readable storage medium (712) having computer-executable instructions stored thereupon that, when executed by one or more processing units (702) of an AI system (120), cause the AI system (120) to: receive an initial query Q that presents a problem with original input values; transform the initial query Q (211) into a template query QT, wherein the original input values are replaced with variables; send multiple prompts (212) to the LLM (130), wherein each of the multiple prompts is different from one another, and contextually related to the template query QT; responsive to the multiple prompts, receive multiple results (213) from the LLM (130), wherein the multiple results each include an analytical expression to solve the mathematical problem; verify results (214) from an evaluation of the outputs of the multiple analytical expressions with the variables being assigned to a common set of randomly sampled values; update statistics (215) from a determination if a statistically significant consensus is achieved for the evaluated outputs; and output final results (216) when the statistically significant consensus condition is reached.

Example 15. The computer-readable storage medium of Example 14, wherein the computer-executable instructions stored thereupon, when executed by one or more processing units of the AI system, further cause the AI system to: for each cycle of a loop: send multiple prompts to the LLM; receive multiple results from the LLM; evaluate the outputs of the multiple analytical expressions; compare the outputs of the evaluations to calculate a consensus rating; determine if additional LLM experiments are required based on a test condition; and terminate the loop when the test condition indicates that additional LLM experiments are not required.

Example 16. The computer-readable storage medium of Example 14, wherein the computer-executable instructions stored thereupon, when executed by one or more processing units of the AI system, further cause the AI system to: wherein the test condition comprises one of: terminate the loop when the number of LLM trials (N) is reached; terminate the loop when all of the evaluated outputs are matched; terminate the loop when all of the evaluated outputs are matched over a specified percentage; terminate the loop when all of the evaluated outputs are matched over a specified number of consecutive evaluation trials; and terminate the loop when all of the evaluated outputs are matched over the specified percentage for the specified number of consecutive trials.

Example 17. An AI system (120), comprising: a processor (702); and a computer-readable storage medium (712) having computer-executable instructions stored thereupon that, when executed by the processor (702), cause the AI system (120) to: receive an initial query Q that presents a problem with original input values; transform the initial query Q (211) into a template query QT, wherein the original input values are replaced with variables; send multiple prompts (212) to the LLM (130), wherein each of the multiple prompts is different from one another, and contextually related to the template query QT; responsive to the multiple prompts, receive multiple results (213) from the LLM (130), wherein the multiple results each include an analytical expression to solve the mathematical problem; verify results (214) from an evaluation of the outputs of the multiple analytical expressions with the variables being assigned to a common set of randomly sampled values; update statistics (215) from a determination if a statistically significant consensus is achieved for the evaluated outputs; and output final results (216) when the statistically significant consensus condition is reached.

Example 18. The AI system of Example 17, wherein the computer-readable storage medium having computer-executable instructions stored thereupon, when executed by the processor, further cause the AI system to: for each cycle of a loop: send multiple prompts to the LLM; receive multiple results from the LLM; evaluate the outputs of the multiple analytical expressions; compare the outputs of the evaluations to calculate a consensus rating; determine if additional LLM experiments are required based on a test condition; and terminate the loop when the test condition indicates that additional LLM experiments are not required.

Example 19. The AI system of Example 17, wherein the computer-readable storage medium having computer-executable instructions stored thereupon, when executed by the processor, further cause the AI system to: wherein the test condition comprises one of: terminate the loop when the number of LLM trials (N) is reached; terminate the loop when all of the evaluated outputs are matched; terminate the loop when all of the evaluated outputs are matched over a specified percentage; terminate the loop when all of the evaluated outputs are matched over a specified number of consecutive evaluation trials; and terminate the loop when all of the evaluated outputs are matched over the specified percentage for the specified number of consecutive trials.

Example 20. The AI system of Example 19, wherein the computer-readable storage medium having computer-executable instructions stored thereupon, when executed by the processor, further cause the AI system to: to output final results: assign the original input values to the variables; select one or more of the expressions for evaluation; evaluate the outputs of each selected expression with the variables being assigned to the original input values; and provide one or more of: the output of each of the selected expressions; the selected expressions with the variables being assigned to the original input values; and the confidence ratings of the selected expressions.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method for an artificial intelligence (AI) system with a large language model (LLM) to solve a mathematical problem, the method comprising:
receiving an initial query that presents a problem with original input values;
creating key-value mappings between the original input values and variables;
transforming the initial query into a template query by replacing the original input values with the variables;
sending multiple prompts to the LLM, wherein each of the multiple prompts is different and contextually related to the template query;
responsive to the multiple prompts, receiving multiple results from the LLM, wherein each of the multiple results includes an analytical expression to solve the mathematical problem;
evaluating outputs of the analytical expressions included in the multiple results with the variables being assigned to a common set of randomly sampled values, wherein evaluating the outputs of the analytical expressions included in the multiple results comprises:
looping through a process over a number of trials, the process comprising:
assigning random values to the variables;
evaluating each of the analytical expressions with the variables having the random values assigned;
calculating a consensus rating based on the evaluating each of the analytical expressions with the variables having the random values assigned;
determining if additional trials are required based on the consensus rating and a test condition; and
terminating the looping when the consensus rating and the test condition indicate that the additional trials are not required; and
outputting final results based on the consensus rating and the test condition indicating that the additional trials are not required.

2. The method of claim 1, further comprising relaxing the test condition for terminating the loop when a non-convergence condition is detected.

3. The method of claim 1, wherein the test condition comprises one of:
terminating the loop when the number of trials is reached;
terminating the loop when all of the evaluated outputs are matched;
terminating the loop when all of the evaluated outputs are matched over a specified percentage;
terminating the loop when all of the evaluated outputs are matched over a specified number of consecutive trials; or
terminating the loop when all of the evaluated outputs are matched over the specified percentage for the specified number of consecutive trials.

4. The method of claim 1, wherein outputting the final results comprises:
assigning the original input values to the variables;
selecting one or more of the analytical expressions for evaluation;
evaluating outputs of each selected analytical expression with the variables having the original input values assigned; and
providing the evaluated outputs of each selected analytical expression.

5. The method of claim 4, wherein selecting one or more of the analytical expressions for evaluation comprises one of:
selecting a single analytical expression;
selecting all analytical expressions;
selecting a single analytical expression above a specified confidence rating;
selecting all analytical expressions above a specified confidence rating;
selecting a first analytical expression from all analytical expressions in a consensus from a most recent iteration;
randomly picking a single analytical expression from all analytical expressions in the consensus from the most recent iteration;
ranking all the analytical expressions in the consensus from the most recent iteration, and selecting a highest ranked analytical expression; and
ranking all the analytical expressions in the consensus from the most recent iteration, and selecting all ranked analytical expressions above a specified rating.

6. A computer-readable storage medium having computer-executable instructions stored thereupon that, when executed by one or more processing units of an artificial intelligence (AI) system with a large language model (LLM), cause the AI system to:
receive an initial query that presents a problem with original input values;
transform the initial query into a template query by replacing the original input values with variables;
send multiple prompts to the LLM, wherein each of the multiple prompts is different and contextually related to the template query;
responsive to the multiple prompts, receive multiple results from the LLM, wherein each of the multiple results includes an analytical expression to solve the mathematical problem;
verify results from an evaluation of outputs of the analytical expressions included in the multiple results with the variables being assigned to a common set of randomly sampled values, wherein verifying the results from the evaluation of the outputs of the analytical expressions included in the multiple results comprises:
looping through a process over a number of trials, the process comprising:
assigning random values to the variables;
evaluating each of the analytical expressions with the variables having the random values assigned;
calculating a consensus rating based on the evaluating each of the analytical expressions with the variables having the random values assigned;
determining if additional trials are required based on the consensus rating and a test condition; and
terminating the looping when the consensus rating and the test condition indicate that the additional trials are not required; and
output final results based on the consensus rating and the test condition indicating that the additional trials are not required.

7. The computer-readable storage medium of claim 6, wherein the computer-executable instructions further cause the AI system to relax the test condition for terminating the loop when a non-convergence condition is detected.

8. The computer-readable storage medium of claim 6, wherein the test condition comprises one of:
- terminating the loop when the number of trials is reached;
- terminating the loop when all of the evaluated outputs are matched;
- terminating the loop when all of the evaluated outputs are matched over a specified percentage;
- terminating the loop when all of the evaluated outputs are matched over a specified number of consecutive trials; or
- terminating the loop when all of the evaluated outputs are matched over the specified percentage for the specified number of consecutive trials.

9. The computer-readable storage medium of claim 6, wherein outputting the final results comprises:
- assigning the original input values to the variables;
- selecting one or more of the analytical expressions for evaluation;
- evaluating outputs of each selected analytical expression with the variables having the original input values assigned; and
- providing the evaluated outputs of each of the selected analytical expression.

10. The computer-readable storage medium of claim 9, wherein selecting one or more of the analytical expressions for evaluation comprises one of:
- selecting a single analytical expression;
- selecting all analytical expressions;
- selecting a single analytical expression above a specified confidence rating;
- selecting all analytical expressions above a specified confidence rating;
- selecting a first analytical expression from all analytical expressions in a consensus from a most recent iteration;
- randomly picking a single analytical expression from all analytical expressions in the consensus from the most recent iteration;
- ranking all the analytical expressions in the consensus from the most recent iteration, and selecting a highest ranked analytical expression; and
- ranking all the analytical expressions in the consensus from the most recent iteration, and selecting all ranked analytical expressions above a specified rating.

11. An artificial intelligence (AI) system, comprising:
a processor; and
a computer-readable storage medium having computer-executable instructions stored thereupon that, when executed by the processor, cause the AI system to:
- receive an initial query that presents a problem with original input values;
- transform the initial query into a template query by replacing the original input values with variables;
- send multiple prompts to the LLM, wherein each of the multiple prompts is and contextually related to the template query;
- responsive to the multiple prompts, receive multiple results from the LLM, wherein each of the multiple results includes an analytical expression to solve the mathematical problem;
- verify results from an evaluation of outputs of the analytical expressions included in the multiple results with the variables being assigned to a common set of randomly sampled values, wherein verifying the results from the evaluation of the outputs of the analytical expressions included in the multiple results comprises:
  - looping through a process over a number of trials, the process comprising:
    - assigning random values to the variables;
    - evaluating each of the analytical expressions with the variables having the random values assigned;
    - calculating a consensus rating based on the evaluating each of the analytical expressions with the variables having the random values assigned;
    - determining if additional trials are required based on the consensus rating and a test condition; and
    - terminating the looping when the consensus rating and the test condition indicate that the additional trials are not required; and
- output final results based on the consensus rating and the test condition indicating that the additional trials are not required.

12. The AI system of claim 11, wherein the computer-executable instructions further cause the AI system to relax the test condition for terminating the loop when a non-convergence condition is detected.

13. The AI system of claim 11, wherein the test condition comprises one of:
- terminating the loop when the number of trials is reached;
- terminating the loop when all of the evaluated outputs are matched;
- terminating the loop when all of the evaluated outputs are matched over a specified percentage;
- terminating the loop when all of the evaluated outputs are matched over a specified number of consecutive trials; or
- terminating the loop when all of the evaluated outputs are matched over the specified percentage for the specified number of consecutive trials.

14. The AI system of claim 11, wherein outputting the final results comprises:
- assigning the original input values to the variables;
- selecting one or more of the analytical expressions for evaluation;
- evaluating outputs of each selected analytical expression with the variables having the original input values assigned; and
- providing the evaluated outputs of each of the selected analytical expression.

15. The AI system of claim 14, wherein selecting one or more of the analytical expressions for evaluation comprises one of:
- selecting a single analytical expression;
- selecting all analytical expressions;
- selecting a single analytical expression above a specified confidence rating;
- selecting all analytical expressions above a specified confidence rating;
- selecting a first analytical expression from all analytical expressions in a consensus from a most recent iteration;
- randomly picking a single analytical expression from all analytical expressions in the consensus from the most recent iteration;
- ranking all the analytical expressions in the consensus from the most recent iteration, and selecting a highest ranked analytical expression; and
- ranking all the analytical expressions in the consensus from the most recent iteration, and selecting all ranked analytical expressions above a specified rating.

* * * * *